US012162428B2

(12) United States Patent
Yamada et al.

(10) Patent No.: US 12,162,428 B2
(45) Date of Patent: Dec. 10, 2024

(54) VEHICLE CONTROL SYSTEM

(71) Applicant: Hitachi Astemo, Ltd., Hitachinaka (JP)

(72) Inventors: Tetsuya Yamada, Tokyo (JP); Mikio Kataoka, Tokyo (JP); Nobuyoshi Morita, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 198 days.

(21) Appl. No.: 18/008,220

(22) PCT Filed: Mar. 18, 2021

(86) PCT No.: PCT/JP2021/011106
§ 371 (c)(1),
(2) Date: Dec. 5, 2022

(87) PCT Pub. No.: WO2022/044401
PCT Pub. Date: Mar. 3, 2022

(65) Prior Publication Data
US 2023/0242071 A1 Aug. 3, 2023

(30) Foreign Application Priority Data
Aug. 26, 2020 (JP) ................. 2020-142753

(51) Int. Cl.
*B60R 25/01* (2013.01)
*B60R 25/32* (2013.01)
*B60R 25/33* (2013.01)
(52) U.S. Cl.
CPC .............. *B60R 25/01* (2013.01); *B60R 25/32* (2013.01); *B60R 25/33* (2013.01)
(58) Field of Classification Search
CPC ......... B60R 25/01; B60R 25/32; B60R 25/33; B60R 2025/0405; B60R 25/102;
(Continued)

(56) References Cited

U.S. PATENT DOCUMENTS

2006/0001317 A1    1/2006  Chen et al.
2008/0001740 A1*   1/2008  Liu ................ G08B 13/1409
                                              340/568.1

FOREIGN PATENT DOCUMENTS

JP        63-255158 A      10/1988
JP      2000-265720 A       9/2000
(Continued)

OTHER PUBLICATIONS

International Search Report (PCT/ISA/210) issued in PCT Application No. PCT/JP2021/011106 dated May 25, 2021 with English translation (two (2) pages).
(Continued)

*Primary Examiner* — Yuen Wong
(74) *Attorney, Agent, or Firm* — Crowell & Moring LLP

(57) ABSTRACT

The disclosure provides a vehicle control system (VCS) capable of safely and forcibly controlling a vehicle. The VCS includes a mode setting unit configured to output a forced mode signal upon receiving a forced control instruction from outside the vehicle via a communication device, and a forced operation unit configured to output a forced operation signal of forcibly operating vehicle to an operation control unit. Further, the VCS includes a signal selection unit configured to allow all the operation signals to pass therethrough before receiving the forced mode signal, and block at least a part of the operation signals and allow the forced operation signal instead of the blocked operation signal to pass therethrough after receiving the forced mode signal. The VCS controls an operation of the vehicle by controlling the operation control unit based on the operation signal or the forced operation signal passing through the signal selection unit.

6 Claims, 14 Drawing Sheets

(58) Field of Classification Search
CPC .............. B60R 25/30; G08G 1/096872; G08G 1/0137; G08G 1/0962; G08G 1/096827; G08B 15/00
See application file for complete search history.

(56) References Cited

FOREIGN PATENT DOCUMENTS

| | | |
|---|---|---|
| JP | 2004-62611 A | 2/2004 |
| JP | 2006-15977 A | 1/2006 |
| JP | 2006-232224 A | 9/2006 |
| JP | 2007-264877 A | 10/2007 |
| WO | WO 2014/056004 A1 | 4/2014 |

OTHER PUBLICATIONS

Japanese-language Written Opinion (PCT/ISA/237) issued in PCT Application No. PCT/JP2021/011106 dated May 25, 2021 (two (2) pages).

* cited by examiner

VEHICLE CONTROL SYSTEM

TECHNICAL FIELD

The present disclosure relates to a vehicle control system.

BACKGROUND ART

Conventionally, an invention related to an anti-theft system of a vehicle has been known (refer to PTL 1 and the like). An anti-theft controller described in PTL 1 controls various electronic devices mounted on a vehicle to perform an abnormal operation. Specifically, for example, a central lock system is repeatedly opened and closed, an electric seat is repeatedly slid back and forth, a fuel pump is intermittently caused to extract oil, or an automatic transmission system shift position detector is continuously caused to output the same shift position electronic signal. Accordingly, the anti-theft controller prevents a thief from driving normally and discourages the thief from stealing a vehicle, thereby making the thief abandon the act of stealing the vehicle (refer to PTL 1, ABSTRACT, and the like).

CITATION LIST

Patent Literature

PTL 1: JP 2006-015977 A

SUMMARY OF INVENTION

Technical Problem

The anti-theft controller in PTL 1 controls various electronic devices mounted on a vehicle to perform an abnormal operation. Therefore, control instructions by these various electronic devices and control instructions by an unauthorized driver's operation conflicting with the control instructions are transmitted to an actuator of a vehicle, and the vehicle may become unstable and fall into a dangerous state.

The present disclosure provides a vehicle control system capable of safely and forcibly controlling a vehicle.

Solution to Problem

One aspect of the present disclosure is a vehicle control system mounted on a vehicle, the vehicle including an operation unit configured to output an operation signal corresponding to an operation by a driver, an operation control unit configured to control an operation of the vehicle based on the operation signal, and a communication device configured to receive a signal transmitted from the outside of the vehicle, the vehicle control system including: a mode setting unit configured to output a forced mode signal upon receiving a forced control instruction from the outside of the vehicle via the communication device; a forced operation unit configured to output a forced operation signal of forcibly operating the vehicle to the operation control unit; and a signal selection unit configured to allow all the operation signals to pass therethrough before receiving the forced mode signal, and block at least a part of the operation signals and allow the forced operation signal instead of the blocked operation signal to pass therethrough after receiving the forced mode signal, in which the operation of the vehicle is controlled by controlling the operation control unit based on the operation signal or the forced operation signal passing through the signal selection unit.

Advantageous Effects of Invention

According to the above aspect of the present disclosure, it is possible to provide a vehicle control system capable of safely and forcibly controlling a vehicle.

DESCRIPTION OF EMBODIMENTS

Hereinafter, embodiments of a vehicle control device according to the present disclosure will be described with reference to the drawings.

First Embodiment

Figure 1:
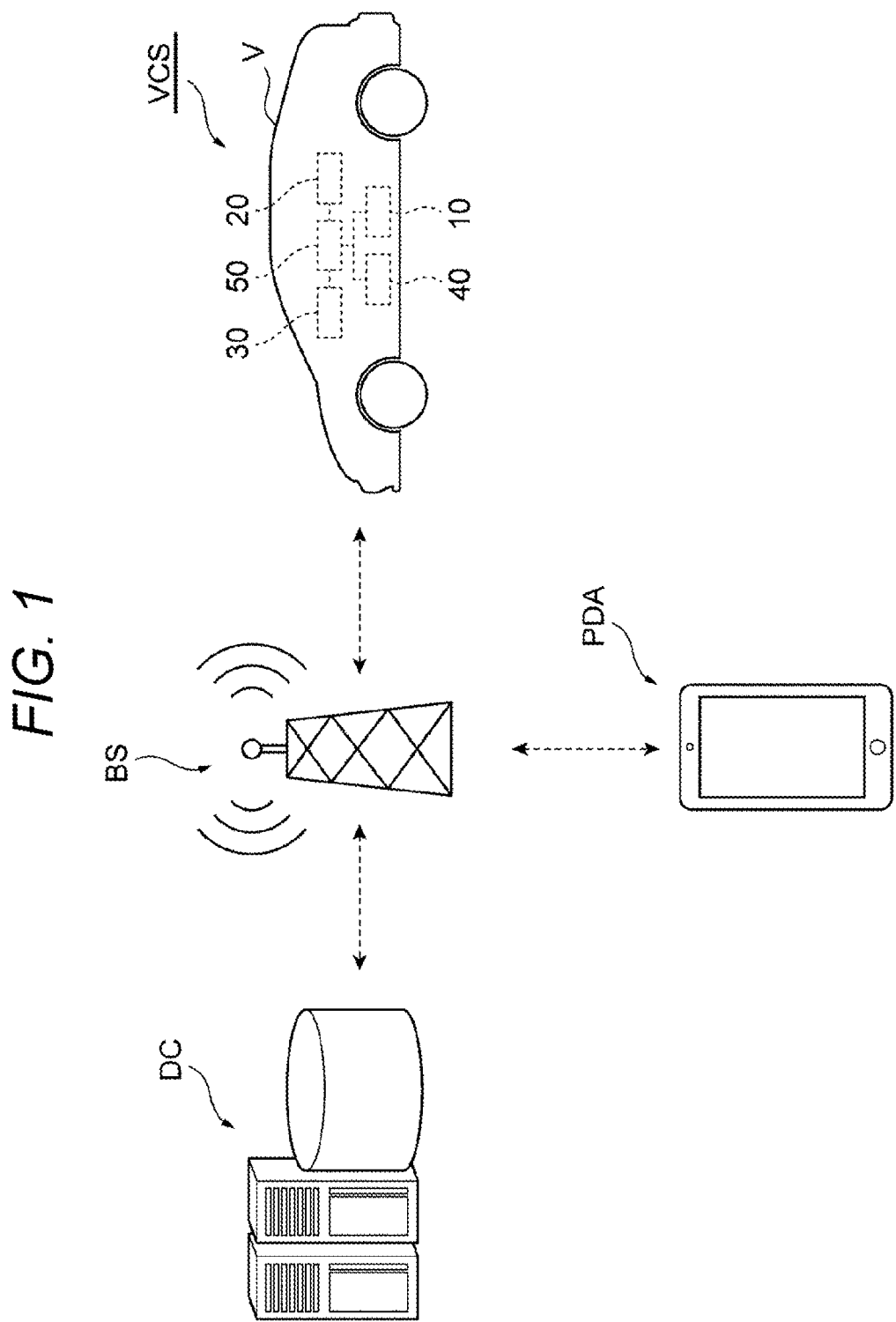
FIG. 1 is a schematic diagram illustrating a first embodiment of a vehicle control system according to the present disclosure.

FIG. 1 is a schematic diagram illustrating a first embodiment of a vehicle control system according to the present disclosure. At least a part of a vehicle control system VCS of the present embodiment is mounted on a vehicle V, and controls the operation of each unit of the vehicle V. The vehicle V includes an operation unit 10 configured to output an operation signal corresponding to an operation by a driver, an operation control unit 20 configured to control an operation of the vehicle V based on the operation signal, and a communication device 30 configured to receive a signal transmitted from the outside of the vehicle V. The vehicle V further includes, for example, a position detection unit 40 configured to detect the position of the vehicle.

For example, the communication device 30 is connected to a data center DC via a base station BS using a wireless communication line so as to be able to perform information communication. In addition, a personal digital assistant PDA possessed by an owner or an authorized user of the vehicle V is connected to, for example, the data center DC via the base station BS using a wireless communication line so as to be able to perform the information communication. The position detection unit 40 is configured by, for example, a receiver of a global navigation satellite system (GNSS) or the like.

Figure 2:
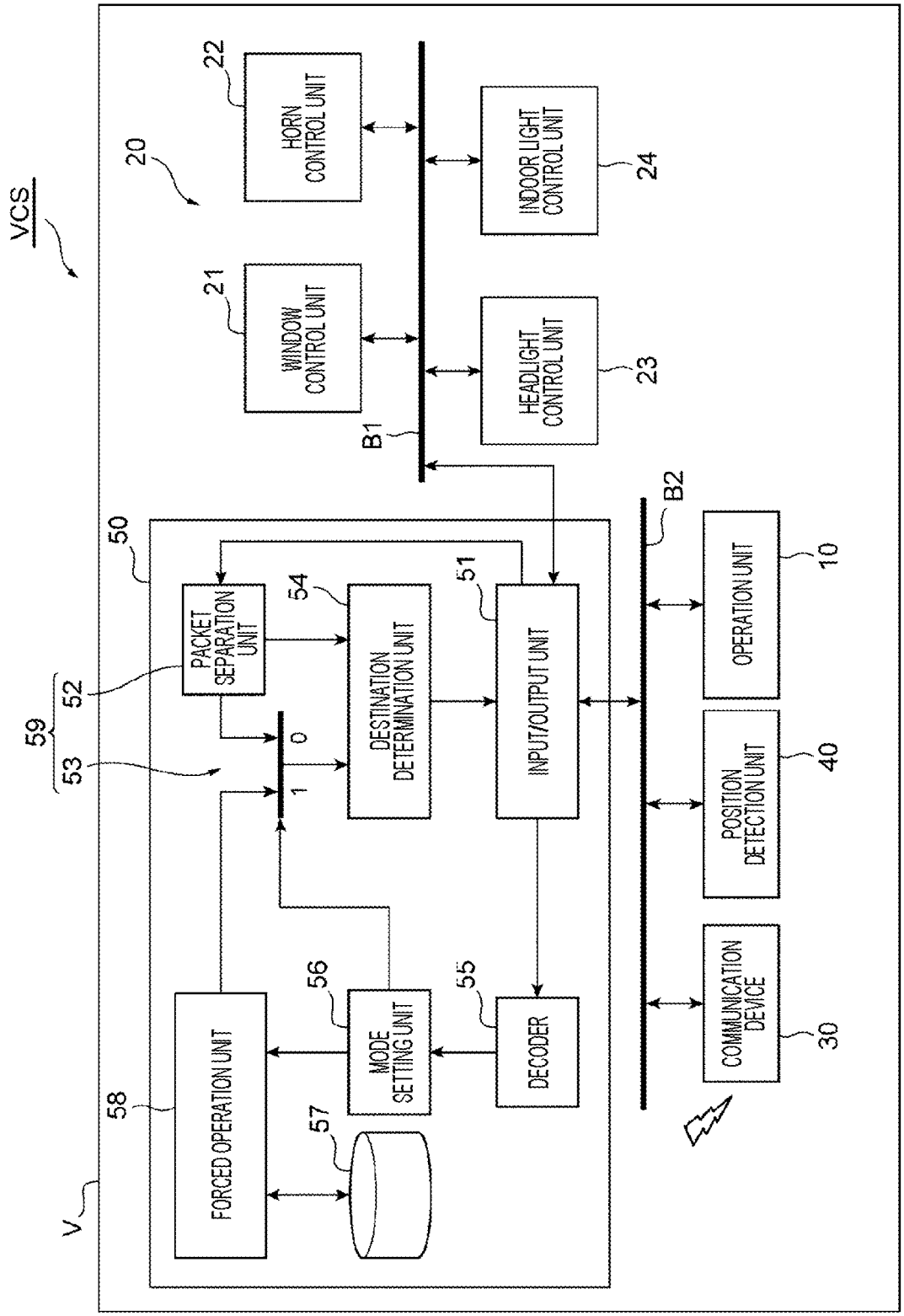
FIG. 2 is a block diagram of the vehicle control system in FIG. 1.

FIG. 2 is a block diagram of the vehicle control system VCS illustrated in FIG. 1. The vehicle control system VCS of the present embodiment is, for example, a central gateway (CGW) unit 50 mounted on the vehicle V. The CGW unit 50 is an electronic control unit (ECU) having a function of relaying data of an in-vehicle local area network (LAN) such as a controller area network (CAN) or Ethernet (registered trademark). The CGW unit 50 includes, for example, an input/output unit, a central processing unit (CPU), a storage device such as a ROM and a RAM, data and programs stored in the storage device, and a timer. That is, the CGW unit is configured by hardware, software, firmware, and the like.

Note that the vehicle control system VCS may include a plurality of CAN buses and a plurality of ECUs connected to the respective CAN buses in addition to the CGW unit 50. The plurality of CAN buses include, for example, a body bus B1 and an information bus B2. Although not illustrated in FIG. 2, the plurality of CAN buses include, for example, a powertrain bus related to driving of the vehicle V. The plurality of ECUs include, for example, the operation control unit 20 connected to the body bus B1 and configured to control the operation of each unit of the vehicle V. For example, the communication device 30, the position detection unit 40, and the operation unit 10 described above are connected to the information bus B2.

The operation unit 10 outputs an operation signal corresponding to an operation by a driver of the vehicle V. The operation unit 10 includes, for example, a steering wheel, an accelerator pedal, a brake pedal, a shift lever, a window opening/closing switch, a horn switch, a headlight switch, an indoor light switch, a direction indicator switch, a hazard lamp switch, and the like.

The operation control unit 20 includes, for example, a window control unit 21, a horn control unit 22, a headlight control unit 23, and an indoor light control unit 24. The window control unit 21 controls opening and closing of the window of the vehicle V. The horn control unit 22 controls blowing of the horn of the vehicle V. The headlight control unit 23 controls turning on and off of the headlight of the vehicle V. Further, the headlight control unit 23 may control blinking of the direction indicator of the vehicle V. The indoor light control unit 24 controls turning on and off of the indoor light of the vehicle V.

The communication device 30 receives a signal transmitted from the outside of the vehicle V. Furthermore, the communication device 30 transmits position information of the vehicle V detected by the position detection unit 40 to the outside of the vehicle V. The position detection unit 40 includes, for example, a GNSS receiver, and acquires the position information of the vehicle V. The configuration of the position detection unit 40 of the present embodiment will be described later.

The CGW unit 50 is connected to, for example, each of the body bus B1 and the information bus B2. Communication of a CAN data packet in the body bus B1 and the information bus B2 is performed by each of the buses. Further, the communication of the CAN data packet between the information bus B2 and the body bus B1 is relayed by the CGW unit 50.

The CGW unit 50 includes, for example, an input/output unit 51, a packet separation unit 52, a selector 53, a destination determination unit 54, a decoder 55, a mode setting unit 56, a storage unit 57, and a forced operation unit 58. Each unit of the CGW unit 50 illustrated in FIG. 2 is a functional block of the CGW unit 50, and represents a function of the CGW unit 50 implemented by hardware, software, firmware, and the like configuring the CGW unit 50.

The input/output unit 51 outputs the operation signal input from the operation unit 10 to the packet separation unit 52. Among the operation signals input from the input/output unit 51, the packet separation unit 52 separates an operation signal for a specific operation control unit 20 and outputs the separated operation signal to the selector 53, and outputs operation signals for other operation control units to the destination determination unit 54. Here, for example, the packet separation unit 52 separates operation signals for the window control unit 21, the horn control unit 22, the headlight control unit 23, and the indoor light control unit 24, and outputs the separated operation signals to the selector 53.

The selector 53 operates in a normal mode until receiving a forced mode signal from the mode setting unit 56. In the normal mode, the selector 53 allows the operation signal input from the packet separation unit 52 to pass through the destination determination unit 54. Further, upon receiving the forced mode signal from the mode setting unit 56, the selector 53 is set to a forced mode. When being set to the forced mode, the selector 53 blocks the operation signal input from the packet separation unit 52 and allows a forced operation signal input from the forced operation unit 58 to pass therethrough.

In the vehicle control system VCS of the present embodiment, the packet separation unit 52 and the selector 53 configure a signal selection unit 59. The signal selection unit 59 allows all the operation signals to pass therethrough before the selector 53 receives the forced mode signal, and blocks at least a part of the operation signals and allows the forced operation signal instead of the blocked operation signal to pass therethrough after the selector 53 receives the forced mode signal.

The destination determination unit 54 sets the destination of the packet of the operation signal or the forced operation signal to one CAN bus among the plurality of CAN buses including the body bus B1 and the information bus B2 based on a CAN-ID included in the packet of the operation signal or the forced operation signal. The input/output unit 51 transmits the packet of the operation signal or the forced operation signal having a set destination to the CAN bus of the set destination.

The decoder 55 decodes a signal of a forced control instruction received by the communication device 30 and input to the input/output unit 51 via the information bus B2. Here, the signal of the forced control instruction has, for example, a specific CAN-ID. For example, when the signal of the forced control instruction is input to the input/output unit 51, the decoder 55 detects the reception of the forced control instruction based on the specific CAN-ID, decodes the signal of the forced control instruction, and outputs the decoded signal to the mode setting unit 56.

Upon receiving the forced control instruction from the decoder 55, the mode setting unit 56 outputs the forced mode signal to the selector 53 and the forced operation unit 58. As described above, the mode setting unit 56 receives the forced control instruction and outputs the forced mode signal, whereby the vehicle control system VCS is set to the forced mode. In other words, until the mode setting unit 56 receives the forced control instruction, the vehicle control system VCS operates in the normal mode.

The storage unit 57 records the forced operation signal of forcibly operating a specific portion of the vehicle V with a specific operation. Here, the specific portion of the vehicle V is, for example, a portion that is not related to traveling of the vehicle V and does not affect safety during traveling of the vehicle V, and examples of the specific portion include a window, a horn, a headlight, a direction indicator, a hazard lamp, and an indoor light. The specific operations of respective units of the vehicle V include, for example, forced opening and closing of the window, forced blowing of the horn, forced blinking of the headlight, forced blinking of the hazard lamp, and forced blinking of the indoor light.

In addition, for example, when the vehicle control system VCS is set to the forced mode, the storage unit 57 records the forced operation signal of causing the position detection unit 40 to forcibly transmit the position information of the vehicle V to the outside of the vehicle V via the communication device 30.

For example, the forced operation unit 58 is set to the forced mode upon receiving the forced mode signal from the mode setting unit 56, reads the forced operation signal from the storage unit 57, and outputs the read forced operation signal to the selector 53. The forced operation signal for each of the operation control units 20 input from the forced operation unit 58 to the selector 53 includes, for example, the CAN-ID similar to the operation signal for each of the operation control units 20 input from the packet separation unit 52 to the selector 53.

Next, an example of an operation of the vehicle control system VCS of the present embodiment will be described.

Figure 3:
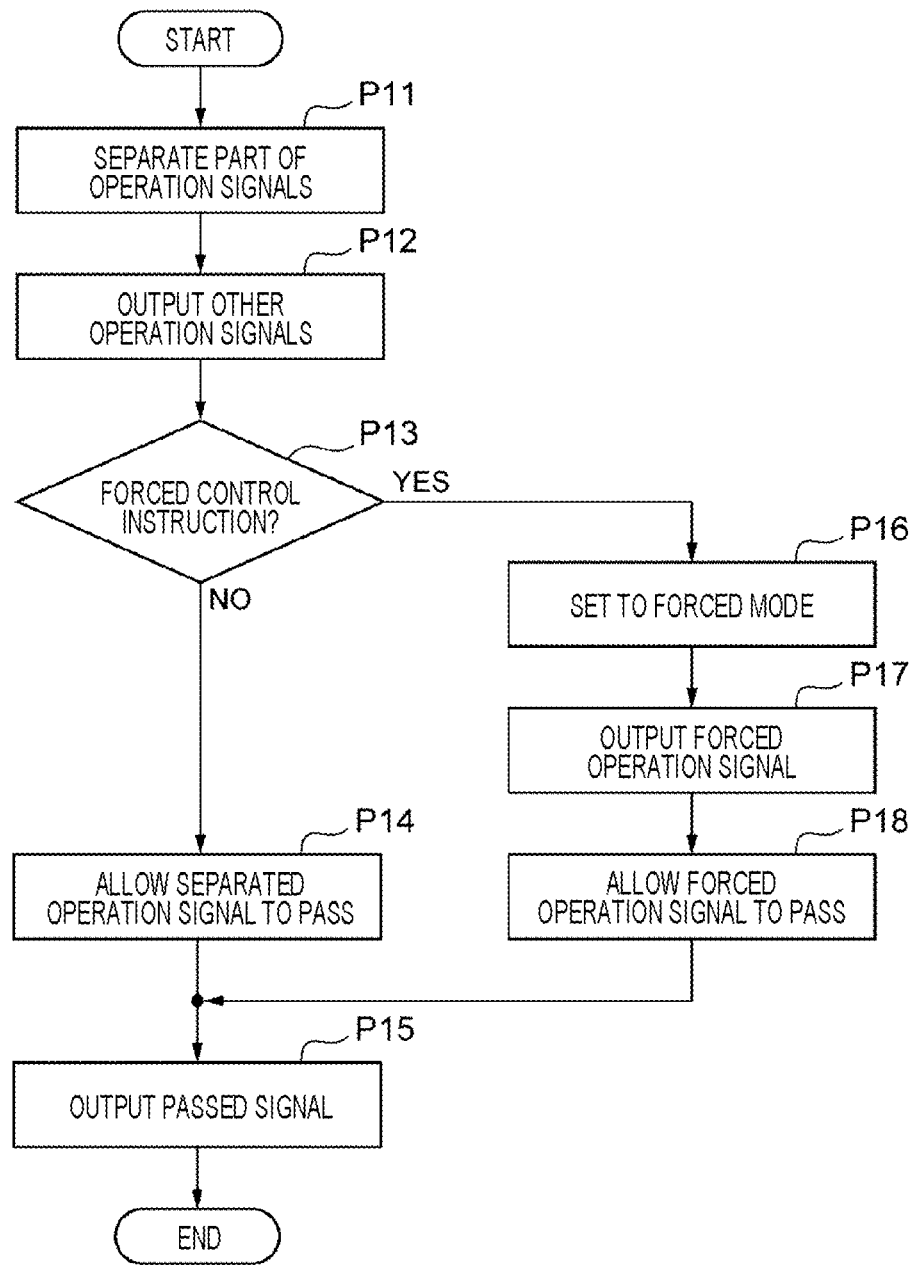
FIG. 3 is a flowchart illustrating an example of an operation of the vehicle control system in FIG. 2.

FIG. 3 is a flowchart illustrating an example of the operation of the vehicle control system VCS of the present embodiment. For example, when a start switch of the vehicle V is turned on, the vehicle control system VCS starts a process illustrated in FIG. 3. When a driver of the vehicle V operates the operation unit 10 of the vehicle V, an operation signal corresponding to an operation of the driver is output from the operation unit 10. The operation signal output from operation unit 10 is input to the input/output unit 51 of the CGW unit 50 via the information bus B2.

As illustrated in FIG. 3, the vehicle control system VCS first executes a process P11 of separating a part of the operation signals input to the CGW unit 50 and a process P12 of outputting another operation signal excluding the part of the operation signals to a specific CAN bus. Specifically, in the process P11, the CGW unit 50 outputs the operation signal input to the input/output unit 51 to the packet separation unit 52. Here, the packet separation unit 52 separates an operation signal for the specific operation control unit 20 including, for example, the window control unit 21, the horn control unit 22, the headlight control unit 23, and the indoor light control unit 24 among the operation signals input from the input/output unit 51, and outputs the separated operation signal to the selector 53.

Further, in the process P12, for example, the packet separation unit 52 outputs, to the destination determination unit 54, another operation signal excluding the operation signal output to the selector 53 among the operation signals input from the input/output unit 51. The destination determination unit 54 sets the destination of the packet of the operation signal to one CAN bus among the plurality of CAN buses including the body bus B1 and the information bus B2 based on the CAN-ID included in the packet of the operation signal input from the packet separation unit 52. The input/output unit 51 outputs the operation signal having the set destination to the set specific CAN bus.

As a result, the operation signal is output to other operation control units except the specific operation control unit 20. As a result, the operation control unit except the operation control unit 20 is controlled based on the operation signal corresponding to the operation of the operation unit 10 by an authorized driver such as an owner or an authorized user of the vehicle V, and, for example, each unit related to traveling of the vehicle operates according to the operation of the driver, thereby causing the vehicle to travel.

Next, the CGW unit 50 executes a process P13 of determining whether or not there is the forced control instruction. In the process P13, when the mode setting unit 56 does not receive the forced control instruction from the outside of the vehicle V via the communication device 30, the information bus B2, the input/output unit 51, and the decoder 55, the mode setting unit 56 determines that there is no forced control instruction (NO), and does not output the forced mode signal to the selector 53. As a result, the CGW unit 50 is not set to a forced mode and is maintained in a normal mode. In the normal mode, the selector 53 executes a process P14 of allowing the operation signal to pass therethrough, in which the operation signal is separated by the packet separation unit 52 and is input to the selector 53.

Next, the CGW unit 50 executes a process P15 of outputting the operation signal passing through the selector 53. Specifically, the selector 53 outputs the operation signal passing therethrough to the destination determination unit 54. The destination determination unit 54 sets the destination of the packet of the operation signal to the body bus B1 based on the CAN-ID included in the operation signal input from the selector 53. The input/output unit 51 transmits the operation signal having the set destination to the body bus B1.

As a result, the operation signal is output to the specific operation control unit 20 according to the operation of the operation unit 10 by the authorized driver. As a result, in the normal mode, the specific operation control unit 20 is controlled based on the operation signal corresponding to the operation of the operation unit 10 by the authorized driver, and the specific portions of the vehicle V including the window, the horn, the headlight, and the indoor light operate according to the operation of the operation unit 10 by the driver.

On the other hand, when the vehicle V is taken away by an unauthorized driver, for example, when the vehicle V is stolen, the owner or the authorized user of the vehicle V operates the personal digital assistant PDA such as a mobile phone or a smartphone illustrated in FIG. 1 to notify the data center DC of the start of forced control. Upon receiving the notification of the start of forced control from the personal digital assistant PDA possessed by the owner or the authorized user of the vehicle V, the data center DC specifies the vehicle V to be subjected to the forced control based on the notified information, and transmits a signal of the forced control instruction to the specified vehicle V.

The input/output unit 51 of the CGW unit 50 receives the forced control instruction transmitted from the data center DC outside the vehicle V via the communication device 30 and the information bus B2. The decoder 55 decodes the signal of the forced control instruction received by the input/output unit 51 and outputs the decoded signal to the mode setting unit 56. Upon receiving the forced control instruction from the decoder 55, the mode setting unit 56 determines that there is the forced control instruction (YES) in the process P13 of determining whether or not there is the forced control instruction, and executes a process P16 of setting the CGW unit 50 to the forced mode.

In the process P16, the mode setting unit 56 outputs the forced mode signal to the selector 53 and the forced operation unit 58, sets the selector 53 and the forced operation unit 58 to the forced mode, and sets the CGW unit 50 to the forced mode. The forced operation unit 58 set to the forced mode executes, for example, a process P17 of reading the forced operation signal stored in the storage unit 57 and outputting the read forced operation signal to the selector 53. In addition, the selector 53 set to the forced mode blocks the operation signal input from the packet separation unit 52, and executes a process P18 of allowing the forced operation signal input from the forced operation unit 58 to pass therethrough.

Next, the CGW unit 50 set to the forced mode executes the process P15 of outputting the signal passing through the selector 53. In the process P15, the destination determination unit 54 sets the destination of the packet of the forced operation signal to the body bus B1 based on the CAN-ID included in the packet of the forced operation signal passing through the selector 53. Then, the input/output unit 51 outputs the packet of the forced operation signal having the set destination to the body bus B1.

Upon receiving the forced operation signal via the body bus B1, the operation control unit 20 operates each unit of the vehicle V according to the forced operation signal. That is, when the CGW unit 50 is set to the forced mode, the operation control unit 20 forcibly operates a specific portion of the vehicle V regardless of the operation of the operation unit 10 by the driver. The forced operations of the specific portions of the vehicle V include, for example, forced opening and closing of the window of the vehicle V by the window control unit 21, forced blowing of the horn by the horn control unit 22, forced blinking of the headlight by the headlight control unit 23, forced blinking of the indoor light by the indoor light control unit 24, and the like.

The forced operations of these specific portions of the vehicle V can cause drivers of other vehicles and pedestrians around the vehicle V to recognize that an emergency situation different from a normal situation occurs in the vehicle V without affecting the safety of the traveling of the vehicle V. As a result, for example, an unauthorized driver of the vehicle V, such as a thief, is forced to stop driving the vehicle V and get off the vehicle V, and as such, it is possible to prevent theft of the vehicle V and prevent the unauthorized driver other than the owner or authorized user of the vehicle V from driving the vehicle V.

As described above, the vehicle control system VCS of the present embodiment is configured by the CGW unit 50 and is mounted on the vehicle V. The vehicle V includes the operation unit 10 configured to output an operation signal corresponding to an operation by a driver, the operation control unit 20 configured to control an operation of the vehicle V based on the operation signal, and a communication device 30 configured to receive a signal transmitted from the outside of the vehicle V. The vehicle control system VCS includes the mode setting unit 56, the forced operation unit 58, and the signal selection unit 59. Upon receiving a forced control instruction from the outside of the vehicle V via the communication device 30, the mode setting unit 56 outputs a forced mode signal. The forced operation unit 58 outputs a forced operation signal of forcibly operating the vehicle V to the operation control unit 20. The signal selection unit 59 allows all the operation signals to pass therethrough before receiving the forced mode signal. After receiving the forced mode signal, the signal selection unit 59 blocks at least a part of the operation signals and allows the forced operation signal instead of the blocked operation signal to pass therethrough. Then, the vehicle control system VCS controls the operation of the vehicle V by controlling the operation control unit 20 based on the operation signal or the forced operation signal passing through the signal selection unit 59.

According to this configuration, upon receiving the forced control instruction, the mode setting unit 56 can output the forced mode signal to set the signal selection unit 59 to the forced mode. When an unauthorized driver operates the operation unit 10 to operate each unit of the vehicle V, the signal selection unit 59 that receives the forced control instruction and is set to the forced mode can block and invalidate an operation signal for a specific operation control unit 20 among the operation signals corresponding to the operation of the operation unit 10. Further, the signal selection unit 59 set to the forced mode allows the forced operation signal output from the forced operation unit 58 instead of a part of the invalidated operation signals to pass therethrough.

As a result, the specific operation control unit 20 can be controlled based on the forced operation signal output from the forced operation unit 58 instead of the operation signal based on the operation by the unauthorized driver. Therefore, since the operation signal and the forced operation signal do not conflict with each other in the operation control unit 20, an operation of the operation control unit 20 is not made unstable. Then, the specific operation control unit 20 forcibly operates a specific portion not related to the traveling of the vehicle V regardless of the operation of the driver, so that the unauthorized driver of the vehicle V can be forced to give up driving. As described above, according to the vehicle control system VCS of the present embodiment, the vehicle V can be safely and forcibly controlled, and the unauthorized driver can be forced to give up driving the vehicle V.

Note that the vehicle control system VCS of the present embodiment may further include the position detection unit 40 in addition to the above configuration. In this case, when the vehicle control system VCS is set to the forced mode, the vehicle control system VCS transmits the forced mode signal from the CGW unit 50 to the position detection unit 40. Upon receiving the forced mode signal from the CGW unit 50, the position detection unit 40 forcibly outputs position information of the vehicle V to the data center DC outside the vehicle V. Hereinafter, an example of a configuration of the position detection unit 40 configured to implement such an operation will be described.

Figure 4:
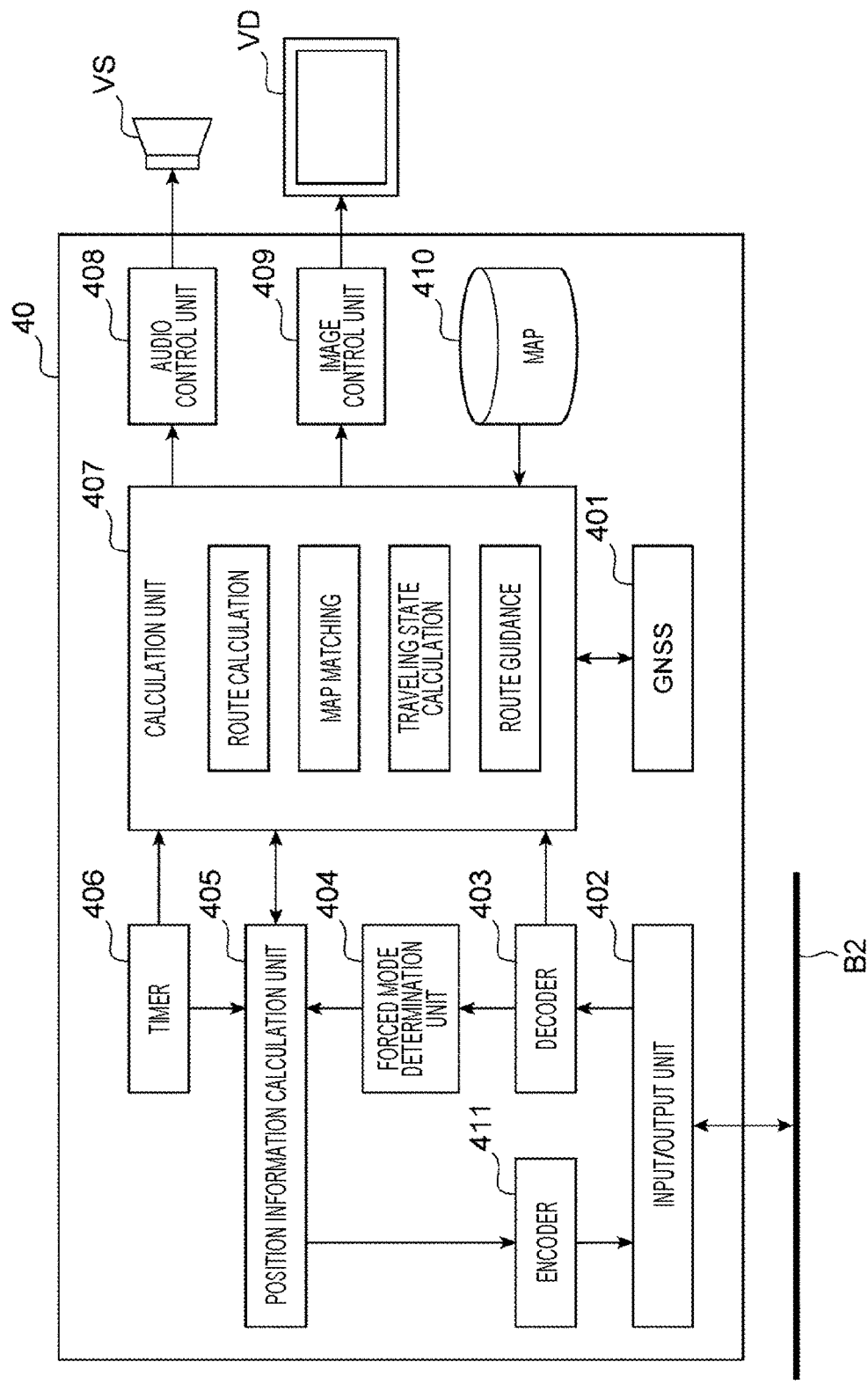
FIG. 4 is a block diagram illustrating an example of a configuration of a position detection unit in FIG. 2.

FIG. 4 is a block diagram illustrating an example of the configuration of the position detection unit 40. The position detection unit 40 includes, for example, a GNSS receiver 401, an input/output unit 402, a decoder 403, a forced mode determination unit 404, a position information calculation unit 405, a timer 406, a calculation unit 407, an audio control unit 408, an image control unit 409, a map information storage unit 410, and an encoder 411.

The position detection unit 40 has, for example, a configuration in which an ECU having a function of outputting position information of the vehicle V to the outside is added to a car navigation device. The ECU includes an input/ output unit, a central processing unit (CPU), a storage device such as a ROM and a RAM, data and programs stored in the storage device, and a timer. That is, the position detection unit 40 includes hardware, software, firmware, and the like. Each unit of the position detection unit 40 illustrated in FIG. 4 is, for example, a functional block that is implemented by hardware, software, firmware, and the like configuring the position detection unit 40 and represents a function of the position detection unit 40.

Figure 5:
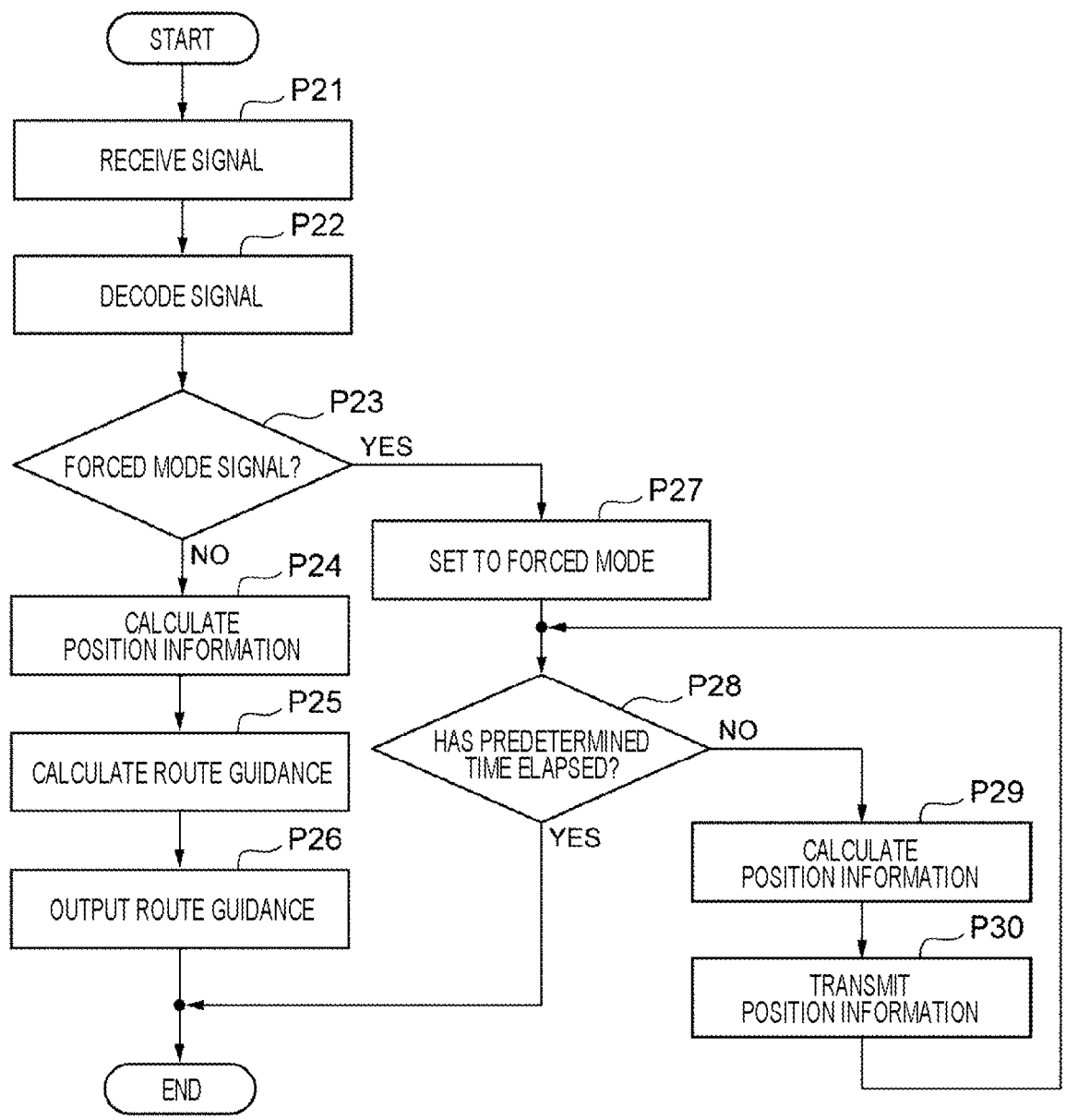
FIG. 5 is a flowchart illustrating an example of an operation of the position detection unit in FIG. 4.

FIG. 5 is a flowchart illustrating an example of an operation of the position detection unit 40 illustrated in FIG. 4. The position detection unit 40 executes a process P21 of receiving a signal from the CGW unit 50 via the input/output unit 402 connected to the information bus B2. Next, the position detection unit 40 executes a process P22 of decoding the received signal by the decoder 403 and outputting the decoded signal to the forced mode determination unit 404. Next, the forced mode determination unit 404 executes a process P23 of determining whether or not the signal input from the decoder 403 includes a forced mode signal, and outputs a determination result to the position information calculation unit 405.

In the process P23, when the forced mode determination unit 404 determines that the input signal does not include the forced mode signal (NO), the position information calculation unit 405 causes the calculation unit 407 to execute a process P24 of calculating position information of the vehicle V. In the process P24, the calculation unit 407 calculates the position information of the vehicle V by a map matching unit based on the position of the vehicle V by GNSS received via the GNSS receiver 401 and map information acquired from the map information storage unit 410.

Furthermore, in a process P25, the calculation unit 407 calculates route guidance information of the vehicle V by a travel state calculation unit, a route calculation unit, a route guidance unit, and the like, and outputs the route guidance information to the audio control unit 408 and the image control unit 409. Next, in a process P26, the audio control unit 408 controls a speaker VS of the vehicle V based on the input route guidance information to perform audio guidance, and the image control unit 409 controls a display VD of the vehicle V to display a guidance image.

On the other hand, when the forced mode determination unit 404 determines that the input signal includes the forced mode signal (YES) in the process P23, the position information calculation unit 405 executes a process P27 of setting the position detection unit 40 to a forced mode. Further, the position information calculation unit 405 starts measurement of the elapsed time after the position detection unit 40 is set to the forced mode by the timer 406, and executes a process P28 of determining whether or not a predetermined time set in advance elapses. Upon determining that the predetermined time does not elapse (NO) in the process P28, the position information calculation unit 405 executes a process P29 of calculating the position information of the vehicle V by the calculation unit 407.

Next, in a process P30, the position information calculation unit 405 outputs the position information of the vehicle V acquired from the calculation unit 407 to the encoder 411. The encoder 411 encodes the position information of the vehicle V input from the position information calculation unit 405, and outputs the encoded position information to the communication device 30 via the input/output unit 402 and the information bus B2. The communication device 30 transmits the position information of the vehicle V received from the position detection unit 40 to the data center DC via a wireless communication line.

Thereafter, until the position information calculation unit 405 determines that the predetermined time elapses (YES) in the process P28, the process P29 of calculating the position information of the vehicle V and the process P30 of transmitting the position information of the vehicle V are repeatedly executed according to interruption of a periodic time interval of the timer 406.

As described above, the vehicle control system VCS of the present embodiment can further include the position detection unit 40 configured to detect the position of the vehicle V. In this case, the position detection unit 40 can include the position information calculation unit 405 configured to calculate position information of the vehicle V, and the forced mode determination unit 404 configured to determine whether or not the forced mode signal is received. When the forced mode determination unit determines that the forced mode signal is received, the position information calculation unit 405 transmits the position information of the vehicle V to the outside of the vehicle V via the communication device 30.

According to this configuration, when the vehicle V is driven by an unauthorized driver and the vehicle control system VCS is set to the forced mode, the position detection unit 40 can forcibly transmit the position information of the vehicle V to the outside of the vehicle V. As a result, for example, an owner or an authorized user of the vehicle V can acquire the position information of the vehicle V from the data center DC by the personal digital assistant PDA. Accordingly, it is possible to grasp the position where the vehicle V is left by the unauthorized driver and to facilitate collection of the vehicle V.

In the present embodiment, the configuration in which a position output function is added to a car navigation device as the position detection unit 40 is described, but the position detection unit 40 may have only a function of detecting the position of the vehicle V and a function of forcibly outputting the detected position of the vehicle V. Further, the CAN bus to which the operation unit 10 is connected is not limited to the information bus B2. Specifically, the operation unit 10 and the operation control unit 20 may be connected to different CAN buses, and an operation signal output from the operation unit 10 may be relayed through the CGW unit 50 and transmitted to the operation control unit 20. Although the present embodiment is described using the CAN bus, when the CGW units are connected by Ethernet (registered trademark), the CGW units have a function of a switch, and the operation unit 10 and the operation control unit 20 do not need to be connected to different buses.

In addition, the vehicle control system VCS may invalidate a start switch when the start switch of the vehicle V is turned off after the forced mode is set. Furthermore, the vehicle control system VCS may include, for example, a detection unit configured to detect disconnection of the communication device 30, and an alarm device configured to issue an alarm when the detection unit detects the disconnection. As a result, when an unauthorized driver disconnects the communication device 30, the detection unit detects the disconnection thereof and the alarm device issues an alarm, thereby making it possible to prevent the unauthorized driver from driving the vehicle V.

Second Embodiment

Figure 6:
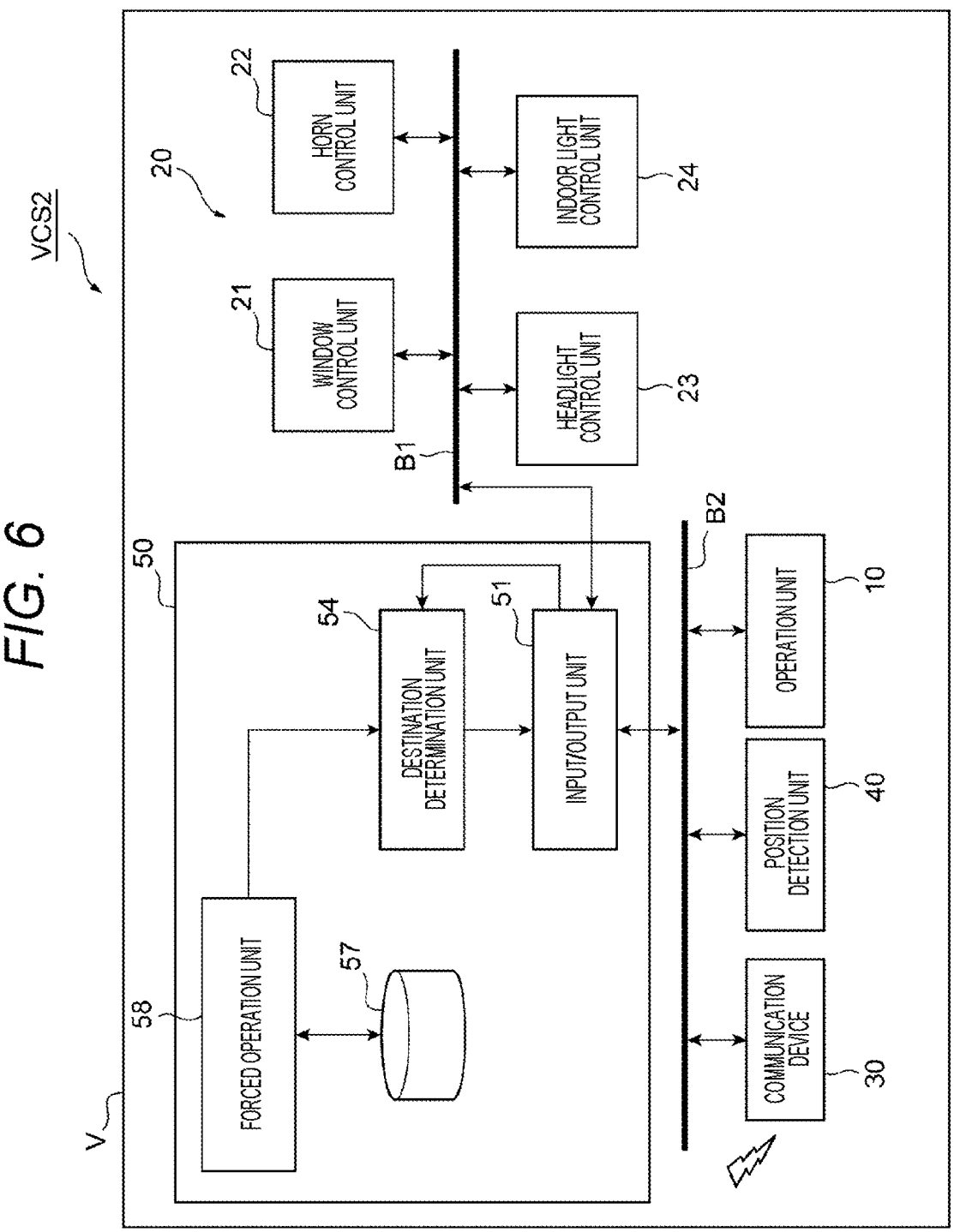
FIG. 6 is a block diagram illustrating a second embodiment of the vehicle control system according to the present disclosure.
Figure 7:
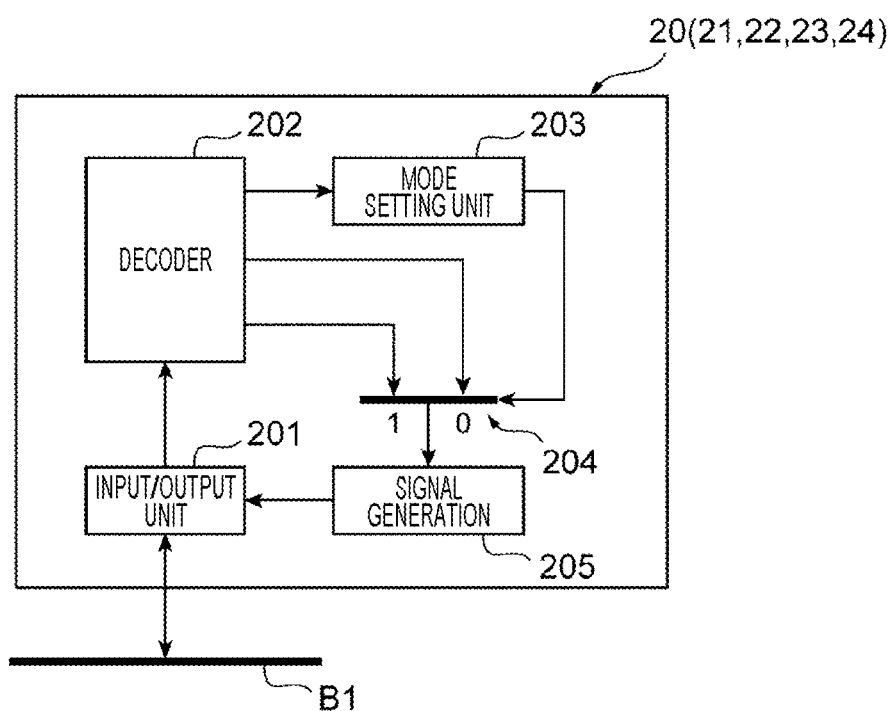
FIG. 7 is a block diagram illustrating a configuration of an operation control unit included in the vehicle control system in FIG. 6.

Next, a second embodiment of the vehicle control system according to the present disclosure will be described with reference to FIG. 1 of the first embodiment and FIGS. 6 to 8. FIG. 6 is a block diagram illustrating the second embodiment of the vehicle control system according to the present disclosure. FIG. 7 is a block diagram of the operation control unit 20 included in a vehicle control system VCS2 in FIG. 6.

The vehicle control system VCS2 of the present embodiment is different from the vehicle control system VCS of the first embodiment in that the mode setting unit 56 and the signal selection unit 59 included in the CGW unit 50 in the first embodiment are included in the operation control unit 20. Since the other configurations of the vehicle control system VCS2 of the present embodiment are similar to those of the vehicle control system VCS of the first embodiment described above, the same components will be denoted by the same reference numerals, and the description thereof will be omitted.

As illustrated in FIG. 6, in the vehicle control system VCS2 of the present embodiment, the CGW unit 50 does not include the decoder 55, the mode setting unit 56, and the signal selection unit 59. As illustrated in FIG. 7, in the vehicle control system VCS2 of the present embodiment, each of the window control unit 21, the horn control unit 22, the headlight control unit 23, and the indoor light control unit 24, which are the operation control unit 20, includes an input/output unit 201, a decoder 202, a mode setting unit 203, a signal selection unit 204, and a signal generation unit 205.

The operation control unit 20 is, for example, an ECU, and includes an input/output unit, a central processing unit (CPU), a storage device such as a ROM and a RAM, data and programs stored in the storage device, and a timer. That is, the operation control unit is configured by hardware, software, firmware, and the like. Each unit of the operation control unit 20 illustrated in FIG. 7 is, for example, a functional block that is implemented by hardware, software, firmware, and the like configuring the operation control unit and represents a function of the operation control unit.

Upon receiving a signal of a forced control instruction from the outside of the vehicle V via the communication device 30 and the information bus B2, the input/output unit 51 of the CGW unit 50 of the present embodiment outputs the received signal to the destination determination unit 54. In the present embodiment, each of the operation signal output from the operation unit 10, the forced control instruction received by the communication device 30, and the forced operation signal output from the forced operation unit 58 includes a unique CAN-ID as identification information of identifying the type of each signal.

Therefore, when the signal of the forced control instruction from the outside of the vehicle V is input, the destination determination unit 54 sets a destination of the forced control instruction to the body bus B1 together with the operation signal from the operation unit 10 and the forced operation signal from the forced operation unit 58. The input/output unit 51 outputs the forced control instruction, the operation signal, and the forced operation signal, each of which has a set destination, to the body bus B1.

Figure 8:
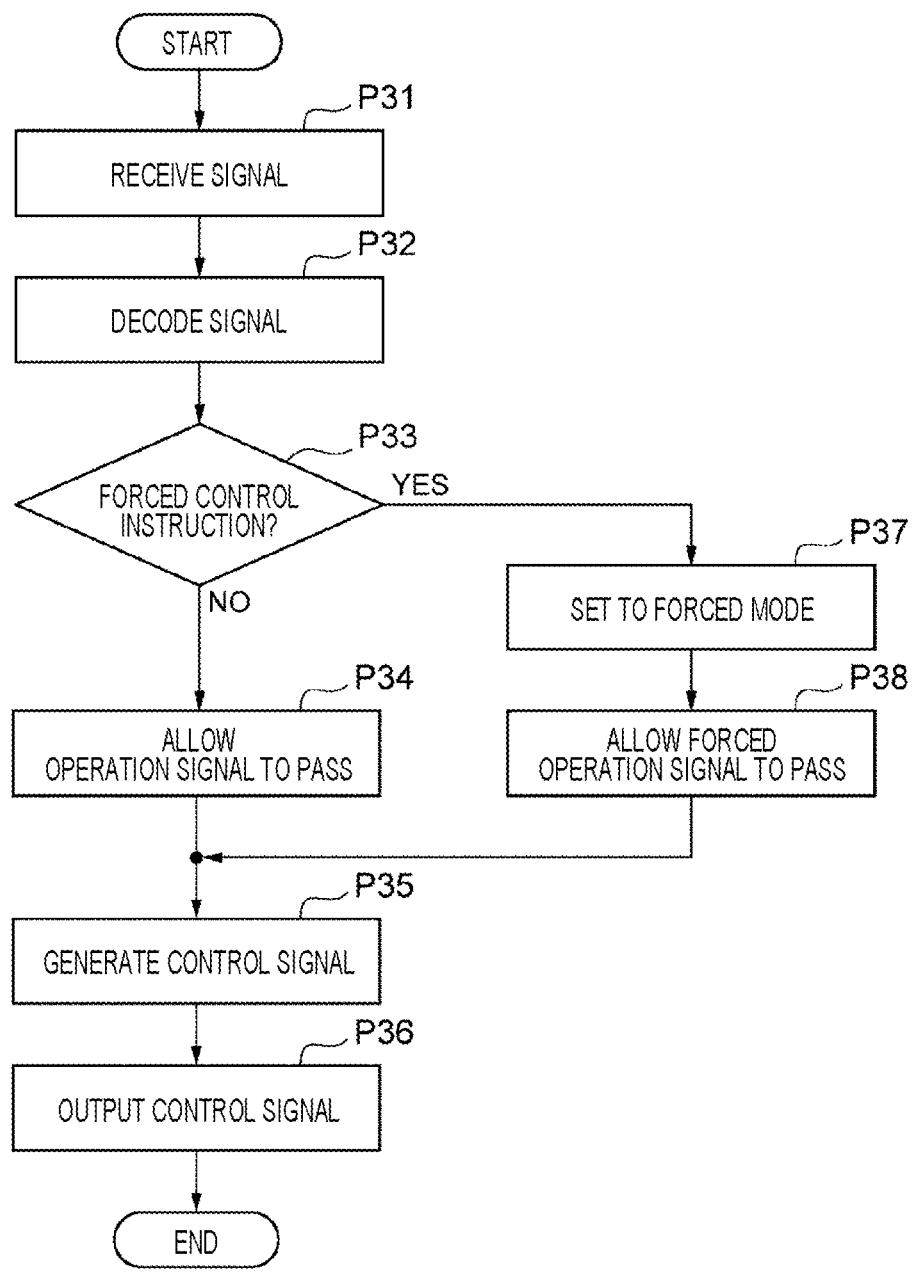
FIG. 8 is a flowchart illustrating an example of an operation of the operation control unit in FIG. 7.

FIG. 8 is a flowchart illustrating an example of an operation of the operation control unit 20 in FIG. 7. First, the operation control unit 20 executes a process P31 of receiving a signal from the body bus B1 by the input/output unit 201 and a process P32 of decoding the received signal by the decoder 202. Further, the decoder 202 executes a process P33 of determining whether or not a forced control instruction is included in the received signal based on the CAN-ID which is the identification information included in each signal.

Upon determining that the forced control instruction is not included therein (NO) in the process P33, the decoder 202 outputs an operation signal and a forced operation signal to the signal selection unit 204. The signal selection unit 204 corresponds to the selector 53 in the first embodiment described above, and, in the normal mode before receiving the forced mode signal from the mode setting unit 203, the signal selection unit 204 executes a process P34 of allowing all the operation signals to pass therethrough and blocking all the forced operation signals.

Next, in a process P35, the signal generation unit 205 generates a control signal based on the operation signal passing through the signal selection unit 204. Next, in a process P36, the input/output unit 201 outputs the control signal generated by the signal generation unit 205 to an actuator or an electronic circuit of each unit of the vehicle V controlled by each operation control unit 20. As a result, until the CGW unit 50 receives the forced control instruction, each of the specific portions of the vehicle V including a window and the like is controlled based on the operation signal corresponding to the operation of the operation unit 10 by the driver of the vehicle V, and operation is performed according to the operation of the driver.

On the other hand, when the operation control unit 20 receives the forced control instruction, in the process P33, the decoder 202 determines that the forced control instruction is included therein (YES), and outputs the forced control instruction to the mode setting unit 203. Upon receiving the forced control instruction from the decoder 202, the mode setting unit 203 outputs the forced mode signal to the signal selection unit 204, and executes a process P37 of setting the operation control unit 20 to a forced mode.

The signal selection unit 204 that receives the forced mode signal and is set to the forced mode executes a process P38 of blocking at least a part of the operation signals and allowing the forced operation signal instead of the blocked operation signal to pass therethrough. Here, the operation signal blocked by the signal selection unit 204 is an operation signal for an actuator and an electronic circuit of each of the specific portions of the vehicle V including a window, a horn, a headlight, an indoor light, and the like not related to the traveling of the vehicle V, similarly to the signal selection unit 59 of the first embodiment described above.

Next, in the process P35, the signal generation unit 205 generates a control signal based on the operation signal and the forced operation signal passing through the signal selection unit 204. Next, in a process P36, the input/output unit 201 outputs the control signal generated by the signal generation unit 205 to an actuator or an electronic circuit of each unit of the vehicle V controlled by each operation control unit 20. As a result, after the CGW unit 50 receives the forced control instruction, each of the specific portions of the vehicle V including the window, the horn, the headlight, the indoor light, and the like forcibly performs a specific operation regardless of the operation of the operation unit 10 by the driver of the vehicle V.

As described above, the vehicle control system VCS2 of the present embodiment further includes the operation control unit 20 illustrated in FIG. 7. In addition, in the vehicle control system VCS2 of the present embodiment, the operation control unit 20 includes the mode setting unit 203 and the signal selection unit 204. Before receiving a forced mode signal, the signal selection unit 204 allows all the operation signals to pass therethrough and blocks all the forced operation signals. After receiving the forced mode signal, the signal selection unit 204 blocks at least a part of the operation signals and allows the forced operation signal instead of the blocked operation signal to pass therethrough.

According to this configuration, the vehicle control system VCS2 of the present embodiment can achieve effects similar to those of the vehicle control system VCS of the first embodiment described above. In addition, according to the vehicle control system VCS2 of the present embodiment, the configuration of the CGW unit 50 can be simplified as compared with the vehicle control system VCS of the first embodiment described above. In addition, similarly to the vehicle control system VCS of the first embodiment, since packets of the forced operation instruction for each operation control unit 20 are sequentially output from the CGW unit 50, it is possible to operate specific portions of the vehicle V in a predetermined order.

In addition, in the vehicle control system VCS2 of the present embodiment, each of the operation signal, the forced control instruction, and the forced operation signal includes identification information of identifying the type of the signal. As a result, the operation control unit 20 can determine that the forced control instruction is received on the basis of the identification information such as the CAN-ID included in the received signal, and can cause the mode setting unit 203 to output the forced mode signal. In addition, the signal selection unit 204 can allow the operation signal or the forced operation signal to selectively pass therethrough.

Third Embodiment

Figure 9:
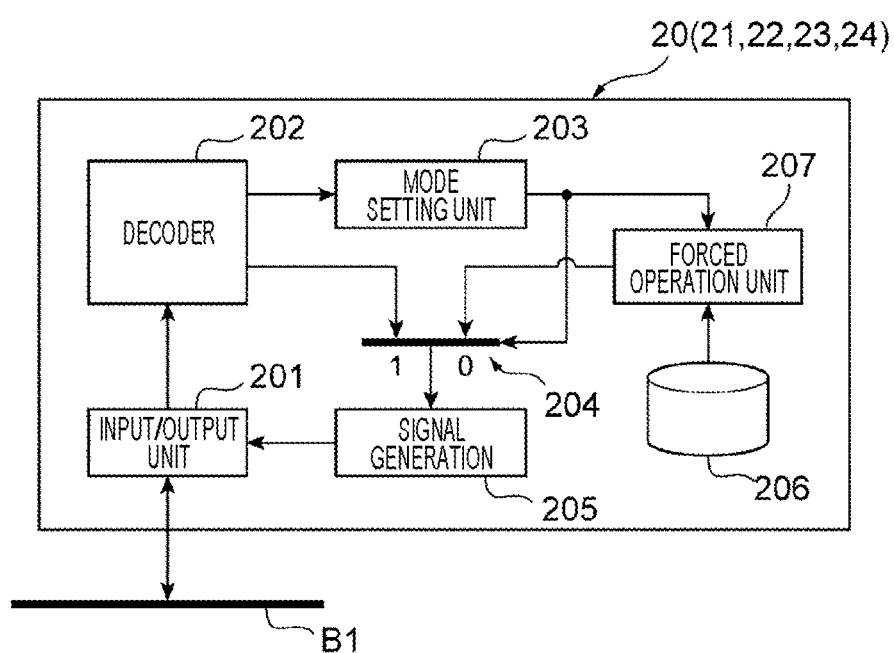
FIG. 9 is a block diagram illustrating an operation control unit of a third embodiment of the vehicle control system according to the present disclosure.

Next, a third embodiment of the vehicle control system according to the present disclosure will be described with reference to FIG. 1 of the first embodiment and FIG. 6 of the second embodiment described above, and FIGS. 9 and 10. FIG. 9 is a block diagram of the operation control unit 20 included in the third embodiment of the vehicle control system according to the present disclosure.

The vehicle control system of the present embodiment is different from the vehicle control system VCS2 of the above-described second embodiment in that the storage unit 57 and the forced operation unit 58 are omitted in the CGW unit 50, and the operation control unit 20 includes a storage unit 206 and a forced operation unit 207. Note that the storage unit 206 and the forced operation unit 207 of the present embodiment have the same configurations as those of the storage unit 57 and the forced operation unit 58 of the first and second embodiments. Since the other configurations of the vehicle control system of the present embodiment are similar to those of the vehicle control system VCS2 of the second embodiment described above, the same components will be denoted by the same reference numerals, and the description thereof will be omitted.

Upon receiving a signal of a forced control instruction from the outside of the vehicle V via the communication device 30 and the information bus B2, the input/output unit 51 of the CGW unit 50 of the present embodiment outputs the received signal to the destination determination unit 54. Upon receiving the signal of the forced control instruction from the outside of the vehicle V, the destination determination unit 54 sets a destination to the body bus B1 together with an operation signal from the operation unit 10. The input/output unit 51 outputs the operation signal and the forced operation instruction, each of which has a set destination, to the body bus B1.

Figure 10:
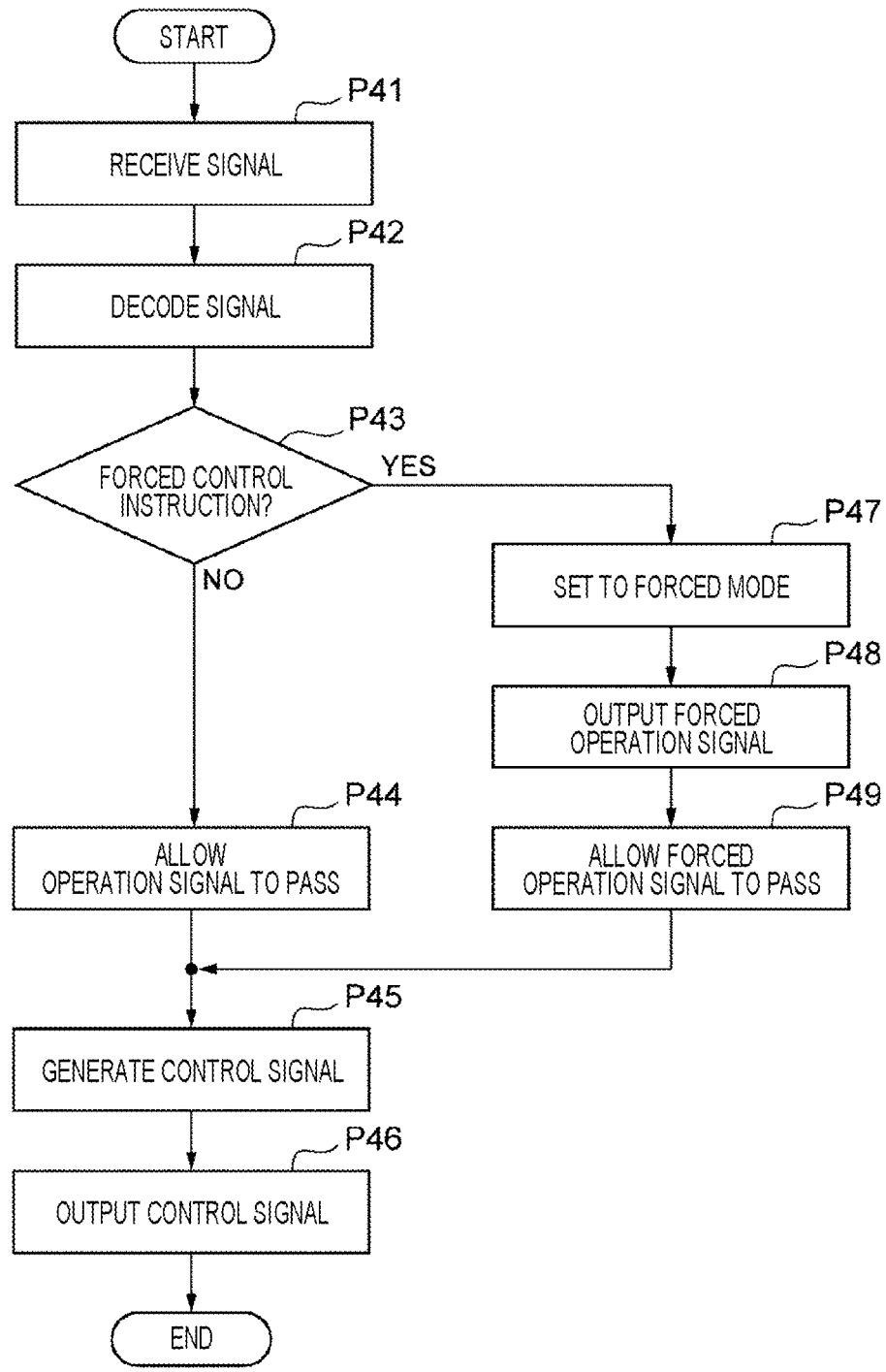
FIG. 10 is a flowchart illustrating an example of an operation of the operation control unit in FIG. 9.

FIG. 10 is a flowchart illustrating an example of an operation of the operation control unit 20 in FIG. 9. First, the operation control unit 20 executes a process P41 of receiving a signal from the body bus B1 by the input/output unit 201 and a process P42 of decoding the received signal by the decoder 202. Further, the decoder 202 executes a process P43 of determining whether or not a forced control instruction is included in the received signal based on a CAN-ID which is identification information included in each signal.

Upon determining that the forced control instruction is not included therein (NO) in the process P43, the decoder 202 outputs an operation signal to the signal selection unit 204. The signal selection unit 204 corresponds to the selector 53 in the first embodiment described above, and executes a process P44 of allowing all the operation signals to pass therethrough before receiving a forced mode signal from the mode setting unit 203. A process P45 and a process P46 to be executed thereafter are similar to the process P35 and the process P36 of the second embodiment described above.

On the other hand, when the operation control unit 20 receives the forced control instruction, in the process P43, the decoder 202 determines that the forced control instruction is included therein (YES), and outputs the forced control instruction to the mode setting unit 203. Upon receiving the forced control instruction from the decoder 202, the mode setting unit 203 outputs the forced mode signal to the signal selection unit 204 and the forced operation unit 207, and executes a process P47 of setting the operation control unit 20 to a forced mode.

The forced operation unit 207 that receives the forced mode signal and is set to the forced mode executes a process P48 of reading a forced operation signal from the storage unit 206 and outputting the read forced operation signal to the signal selection unit 204. The signal selection unit 204 that receives the forced mode signal and is set to the forced mode executes a process P49 of blocking at least a part of the operation signals and allowing the forced operation signal instead of the blocked operation signal to pass therethrough.

Here, the operation signal blocked by the signal selection unit 204 is an operation signal for an actuator and an electronic circuit of each of the specific portions of the vehicle V including a window, a horn, a headlight, an indoor light, and the like not related to the traveling of the vehicle V, similarly to the signal selection unit 59 of the first embodiment described above. A process P45 and a process P46 to be executed thereafter are similar to the process P35 and the process P36 of the second embodiment described above.

As described above, in the vehicle control system of the present embodiment, the operation control unit 20 further includes the forced operation unit 207 in addition to the configuration of the second embodiment illustrated in FIG. 7. Therefore, according to the vehicle control system of the present embodiment, it is possible not only to achieve effects similar to those of the vehicle control system VCS of the first embodiment and the vehicle control system VCS2 of the second embodiment described above, but also to omit the forced operation unit 58 and the storage unit 57 in the CGW unit 50, thereby making it possible to further simplify the configuration of the CGW unit 50. In addition, capacity of a flash memory configuring the storage unit 206 of each operation control unit 20 can be further reduced.

Fourth Embodiment

Figure 11:
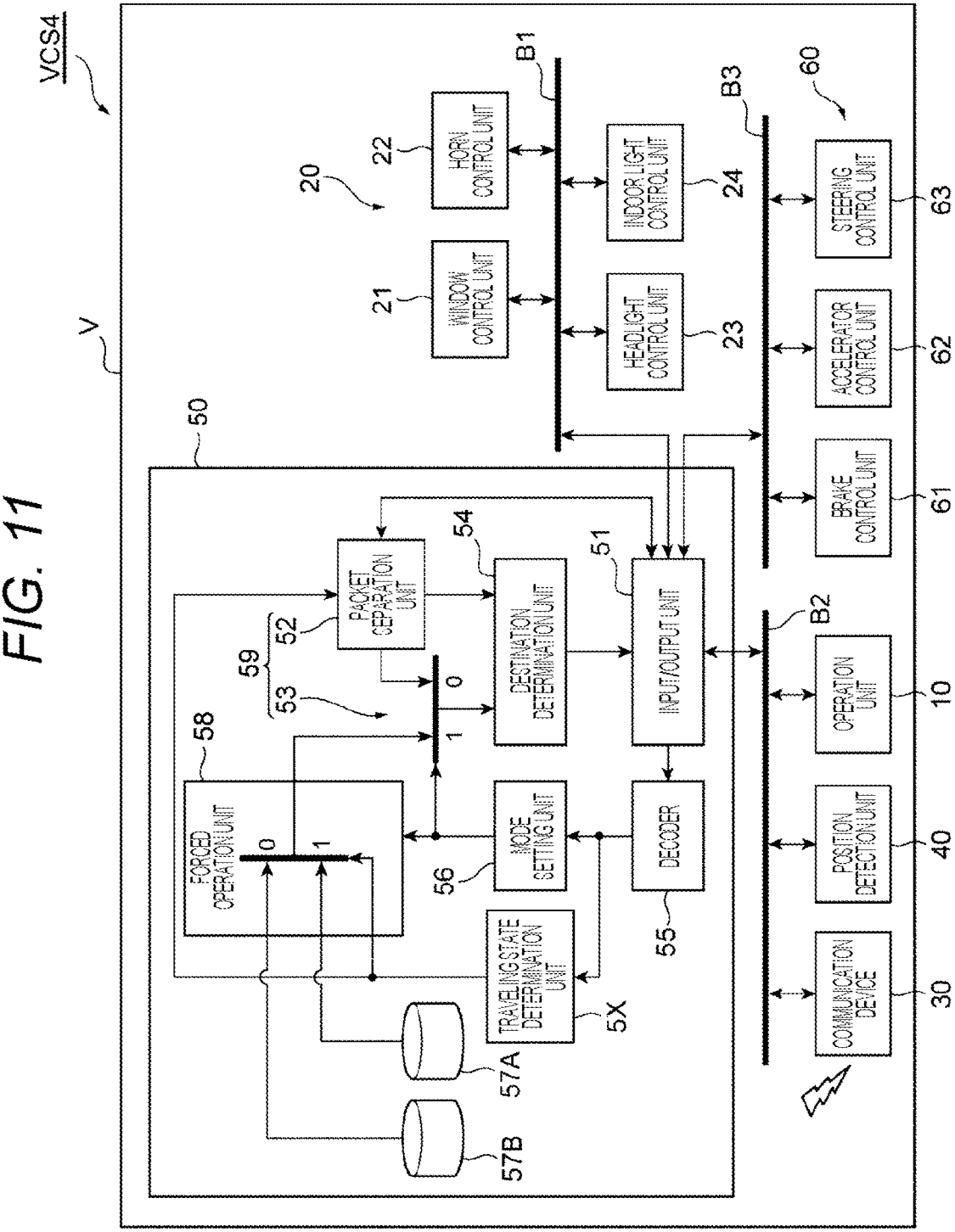
FIG. 11 is a block diagram illustrating a fourth embodiment of the vehicle control system according to the present disclosure.

Next, a fourth embodiment of the vehicle control system according to the present disclosure will be described with reference to FIG. 1 of the first embodiment and FIGS. 11 and 12. FIG. 11 is a block diagram of the fourth embodiment of the vehicle control system according to the present disclosure.

In a vehicle control system VCS4 of the present embodiment, a power train bus B3 is further connected to the CGW unit 50, and an operation control unit 60 configured to control the operation of the vehicle V based on an operation signal is connected to the power train bus B3. Further, the CGW unit 50 includes a traveling state determination unit 5X, and a plurality of storage units 57A and 57B. Furthermore, the forced operation unit 58 includes a selector. Since the other configurations of the vehicle control system VCS4 of the present embodiment are similar to those of the vehicle control system VCS of the first embodiment, the same components will be denoted by the same reference numerals, and the description thereof will be omitted.

The operation control unit 60 controls operations related to the traveling of the vehicle V, such as acceleration/deceleration, constant-speed traveling, braking, and course change of the vehicle V, based on the operation signal output according to the operation of the operation unit 10 by a driver of the vehicle V. Here, the operation unit 10 includes, for example, an accelerator pedal, a brake pedal, a steering wheel, and the like.

The operation control unit 60 includes, for example, a brake control unit 61, an accelerator control unit 62, and a steering control unit 63. The brake control unit 61 is, for example, an ECU configured to control an actuator configured to operate a brake of the vehicle V. The accelerator control unit 62 is, for example, an ECU configured to control a drive motor of the vehicle V or an actuator configured to operate a throttle valve of the vehicle V. The steering control unit 63 is, for example, an ECU configured to control a steering actuator of the vehicle V.

The first storage unit 57A included in the plurality of storage units 57A and 57B of the CGW unit 50 stores a first forced operation signal not related to the traveling of the vehicle V. The first forced operation signal is a signal of controlling the operation control unit 20 configured to operate portions not related to the traveling of the vehicle V, such as a window, a horn, a headlight, and an indoor light.

The second storage unit 57B included in the plurality of storage units 57A and 57B of the CGW unit 50 stores a second forced operation signal related to the traveling of the vehicle V. The second forced operation signal is a signal of controlling the operation control unit 60 configured to operate portions related to the traveling of the vehicle V, such as a brake, an accelerator, and a steering mechanism. The second forced operation signal can include, for example, a signal that does not start an engine or a drive motor, a signal that does not release a parking brake, a signal that sets an operation amount of an accelerator to zero, a signal that sets a steering angle to zero, a signal that does not operate a power steering, and the like.

For example, the traveling state determination unit 5X determines a traveling state of the vehicle V based on outputs of sensors mounted on the vehicle V, such as a speed sensor, an acceleration sensor, an angular acceleration sensor, and the position detection unit 40 connected to the information bus B2. More specifically, the traveling state determination unit 5X determines, for example, whether the vehicle V is traveling or stopped. The traveling state determination unit 5X outputs a determination result of the traveling state of the vehicle V to, for example, the selector of the forced operation unit 58 and the packet separation unit 52 of the signal selection unit 59.

Figure 12:
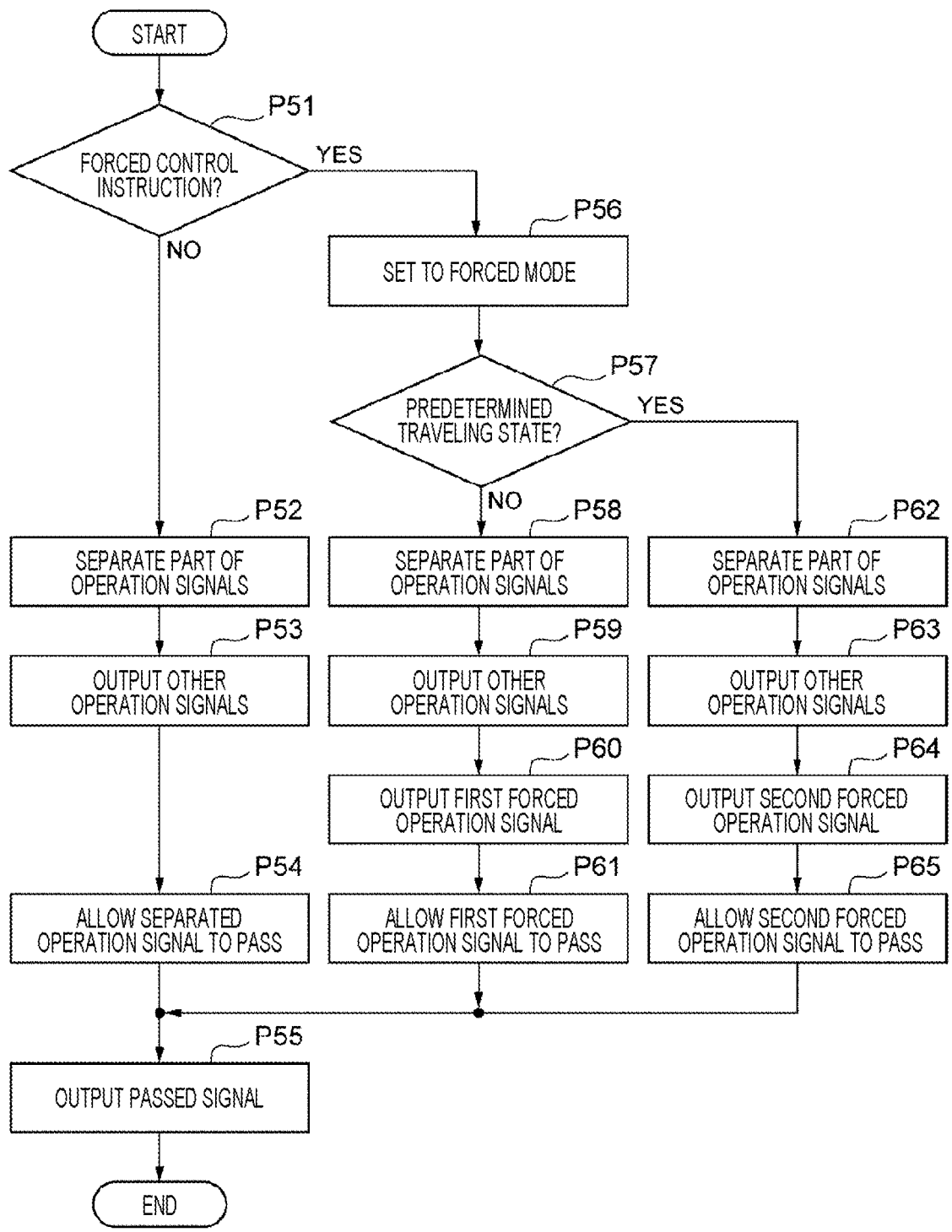
FIG. 12 is a flowchart illustrating an example of an operation of the vehicle control system in FIG. 11.

FIG. 12 is a flowchart illustrating an example of an operation of the vehicle control system VCS4 in FIG. 11. The vehicle control system VCS first executes a process P51 of determining whether or not there is the forced control instruction. Specifically, the input/output unit 51 of the CGW unit 50 receives a signal from the information bus B2, and outputs the signal to the decoder 55. The decoder 55 decodes the signal input from the input/output unit 51, and determines whether or not the forced control instruction is included in the decoded signal.

In the process P51, when the decoder 55 determines that the forced control instruction is not included therein (NO), the CGW unit 50 maintains a normal mode. In this case, the CGW unit 50 executes processes P52, P53, P54, and P55 similar to the processes P11, P12, P14, and P15 in the normal mode of the vehicle control system VCS of the first embodiment illustrated in FIG. 3.

On the other hand, in the process P51, when the decoder 55 determines that the forced control instruction is included therein (YES), the decoder 55 outputs the forced control instruction to the mode setting unit 56. Upon receiving the forced control instruction from the decoder 55, the mode setting unit 56 outputs a forced mode signal to the forced operation unit 58 and the selector 53 of the signal selection unit 59, and executes a process P56 of setting the CGW unit 50 to a forced mode. In addition, the decoder 55 outputs a detection result of a sensor configured to detect the traveling state of the vehicle V among the decoded signals to the traveling state determination unit 5X.

Next, the CGW unit 50 executes a process P57 of determining the traveling state of the vehicle V. In the process P57, the traveling state determination unit 5X determines whether or not the traveling state of the vehicle V is a predetermined traveling state based on the detection result of the sensor input from the decoder 55. As the predetermined traveling state, for example, a state in which the speed of the vehicle V is zero, that is, a state in which the vehicle V is stopped can be exemplified.

In the process P57, for example, upon determining that the vehicle V is traveling and the traveling state of the vehicle V is not the predetermined traveling state (NO), the traveling state determination unit 5X outputs the determination result to the forced operation unit 58 and the packet separation unit 52 of the signal selection unit 59. In this case, the CGW unit 50 executes processes P58, P59, P60, and P61 similar to the processes P11, P12, P17, and P18 executed when the vehicle control system VCS of the first embodiment illustrated in FIG. 3 is set to the forced mode.

On the other hand, upon determining that, for example, the vehicle V is stopped and the traveling state of the vehicle V is the predetermined traveling state (YES) in the process P57, the traveling state determination unit 5X outputs the determination result to the forced operation unit 58 and the packet separation unit 52 of the signal selection unit 59. Then, the packet separation unit 52 executes a process P62 of separating an operation signal related to the traveling of the vehicle V among the operation signals based on the operation of the operation unit 10 by the driver of the vehicle V input via the input/output unit 51, and outputting the operation signal to the selector 53.

Moreover, the packet separation unit 52 executes a process P63 of outputting another operation signal other than the operation signal output to the selector 53 to the destination determination unit 54 to set a destination, and outputting the destination to the body bus B1 and the information bus B2 via the input/output unit 51. Next, the forced operation unit 58 executes a process P64 of reading a second forced operation signal stored in the second storage unit 57B and outputting the second forced operation signal to the selector 53 by the forced operation unit 58 set to the forced mode. The second forced operation signal is a forced operation signal for the operation control unit 60 configured to control the operation related to the traveling of the vehicle V.

Next, the selector 53 that receives the forced mode signal and is set to the forced mode executes a process P65 of blocking the operation signal input from the packet separation unit 52 and allowing the second forced operation signal input from the forced operation unit 58 to pass therethrough. Thereafter, the CGW unit 50 executes a process P55 of outputting the second forced operation signal passing through the selector 53 to the operation control unit 60 by the destination determination unit 54 and the input/output unit 51.

As described above, the vehicle control system VCS4 of the present embodiment further includes the traveling state determination unit 5X configured to determine the traveling state of the vehicle V. Additionally, when the traveling state determination unit 5X determines that the vehicle V is traveling, the forced operation unit 58 outputs the first forced operation signal not related to the traveling of the vehicle V, and when the traveling state determination unit 5X determines that the vehicle V is stopped, the forced operation unit 58 outputs the second forced operation signal related to the traveling of the vehicle V.

According to such a configuration, when the vehicle V is traveling, the vehicle control system VCS4 of the present embodiment can achieve effects similar to those of the vehicle control system VCS of the first embodiment described above. In addition, when the vehicle V is stopped, the vehicle control system VCS4 of the present embodiment can invalidate an operation signal related to the traveling of the vehicle V among the operation signals based on the operation of the operation unit 10 by a driver of the vehicle V.

Further, the vehicle control system VCS of the present embodiment can output the second forced operation signal related to the traveling of the vehicle V instead of the invalidated operation signal to the operation control unit 60 via the power train bus B3. As a result, for example, when the vehicle V is stopped in a safe state, it is possible to prevent an unauthorized driver of the vehicle V from starting an engine or a drive motor, releasing a parking brake, operating an accelerator, operating a steering wheel, and the like.

Fifth Embodiment

Figure 13:
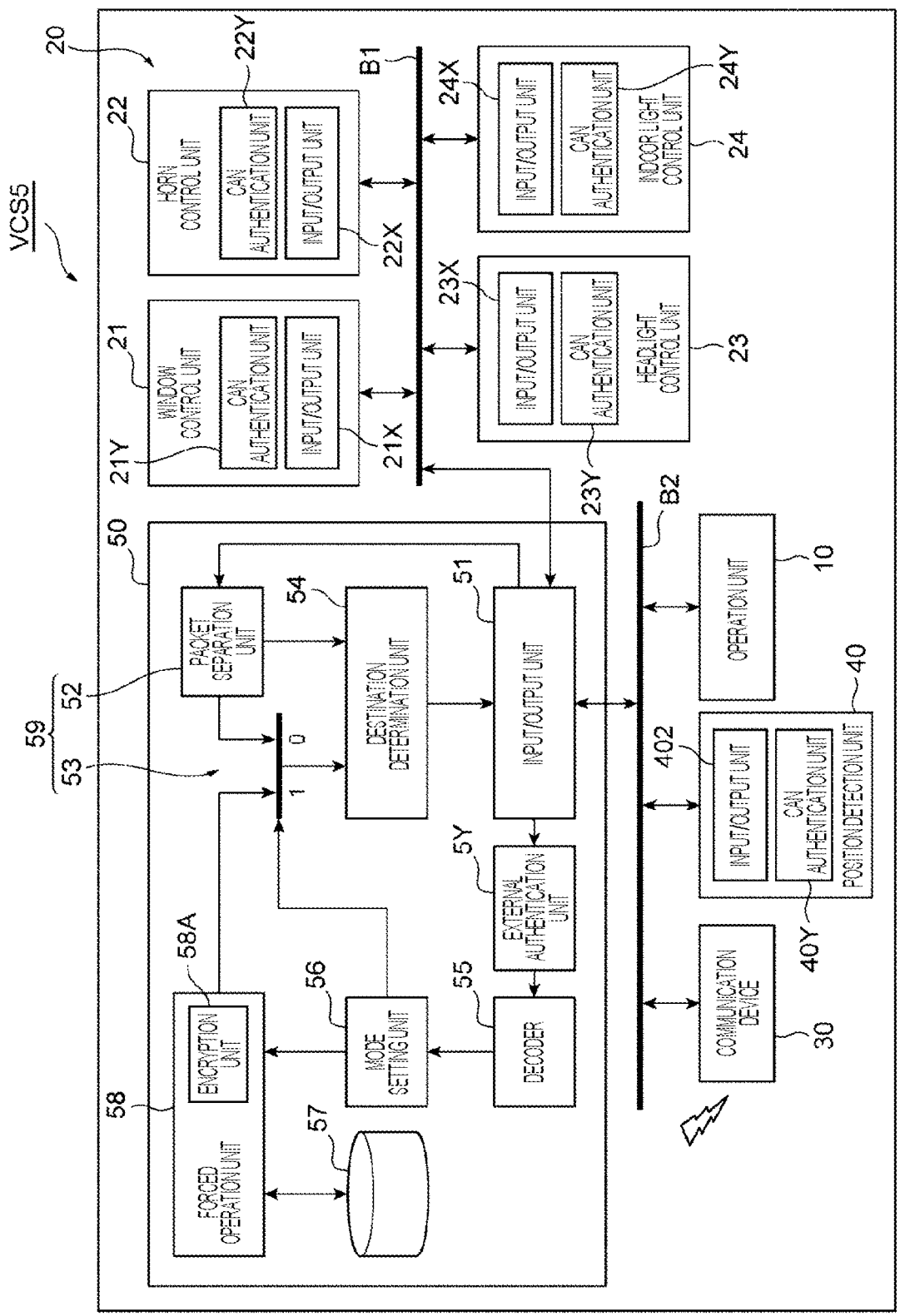
FIG. 13 is a block diagram illustrating a fifth embodiment of the vehicle control system according to the present disclosure.

Next, a fifth embodiment of the vehicle control system according to the present disclosure will be described with reference to FIGS. 1 and 4 of the first embodiment described above and FIG. 13. FIG. 13 is a block diagram of the fifth embodiment of the vehicle control system according to the present disclosure.

In a vehicle control system VCS5 of the present embodiment, the CGW unit 50 includes an external authentication unit 5Y, and the forced operation unit 58 includes an encryption unit 58A. In addition, each of the operation control units 20 connected to the body bus B1 and the position detection unit 40 connected to the information bus B2 include internal authentication units 21Y, 22Y, 23Y, 24Y, and 40Y as CAN authentication units, respectively. Since the other configurations of the vehicle control system VCS5 of the present embodiment are similar to those of the vehicle control system VCS of the first embodiment described above, the same components will be denoted by the same reference numerals, and the description thereof will be omitted.

In the vehicle control system VCS5 of the present embodiment, a forced control instruction for setting the vehicle control system VCS5 to a forced mode is encrypted and transmitted from the data center DC outside the vehicle V. The external authentication unit 5Y of the CGW unit 50 authenticates the encrypted forced control instruction received by the input/output unit 51 via the communication device 30 and the information bus B2, and outputs the authenticated forced control instruction to the decoder 55.

In addition, the encryption unit 58A encrypts a forced operation signal output from the forced operation unit 58 when the CGW unit 50 is set to the forced mode. Upon receiving the encrypted forced operation signal via the body bus B1 and the input/output units 21X, 22X, 23X, and 24X, the operation control unit 20 authenticates the forced operation signal by the internal authentication units 21Y, 22Y, 23Y, and 24Y.

Similarly, upon receiving the encrypted forced control instruction via the information bus B2 and the input/output unit 402, the position detection unit 40 performs authentication by the internal authentication unit 40Y and outputs the authenticated forced control instruction to the decoder 403. Other operations of the vehicle control system VCS of the present embodiment are similar to the operations of the vehicle control system VCS of the first embodiment described above.

As described above, the vehicle control system VCS5 of the present embodiment further includes the external authentication unit 5Y configured to authenticate the encrypted forced control instruction and the encryption unit 58A configured to encrypt the forced operation signal, in addition to the configuration of the vehicle control system VCS according to the first embodiment described above. In addition, the operation control unit 20 includes the internal authentication unit configured to authenticate the encrypted forced operation signal.

According to such a configuration, the vehicle control system VCS5 of the present embodiment can not only achieve effects similar to those of the vehicle control system VCS according to the first embodiment described above, but also improve the safety of the vehicle control system VCS5. More specifically, the vehicle control system VCS5 of the present embodiment can improve security performance by encrypting a forced control command between the outside of the vehicle V and the CGW unit 50 and the position detection unit 40.

In addition, the vehicle control system VCS5 of the present embodiment has a two-stage security function of encrypting the forced operation signal from the CGW unit 50 to the operation control unit 20. As a result, impersonation or falsification due to maliciousness of a third party can be prevented not only between the outside of the vehicle V and the CGW unit 50 but also between the CGW unit 50 and the operation control unit 20, thereby making it possible to improve the safety of the vehicle control system VCS5.

Sixth Embodiment

Figure 14:
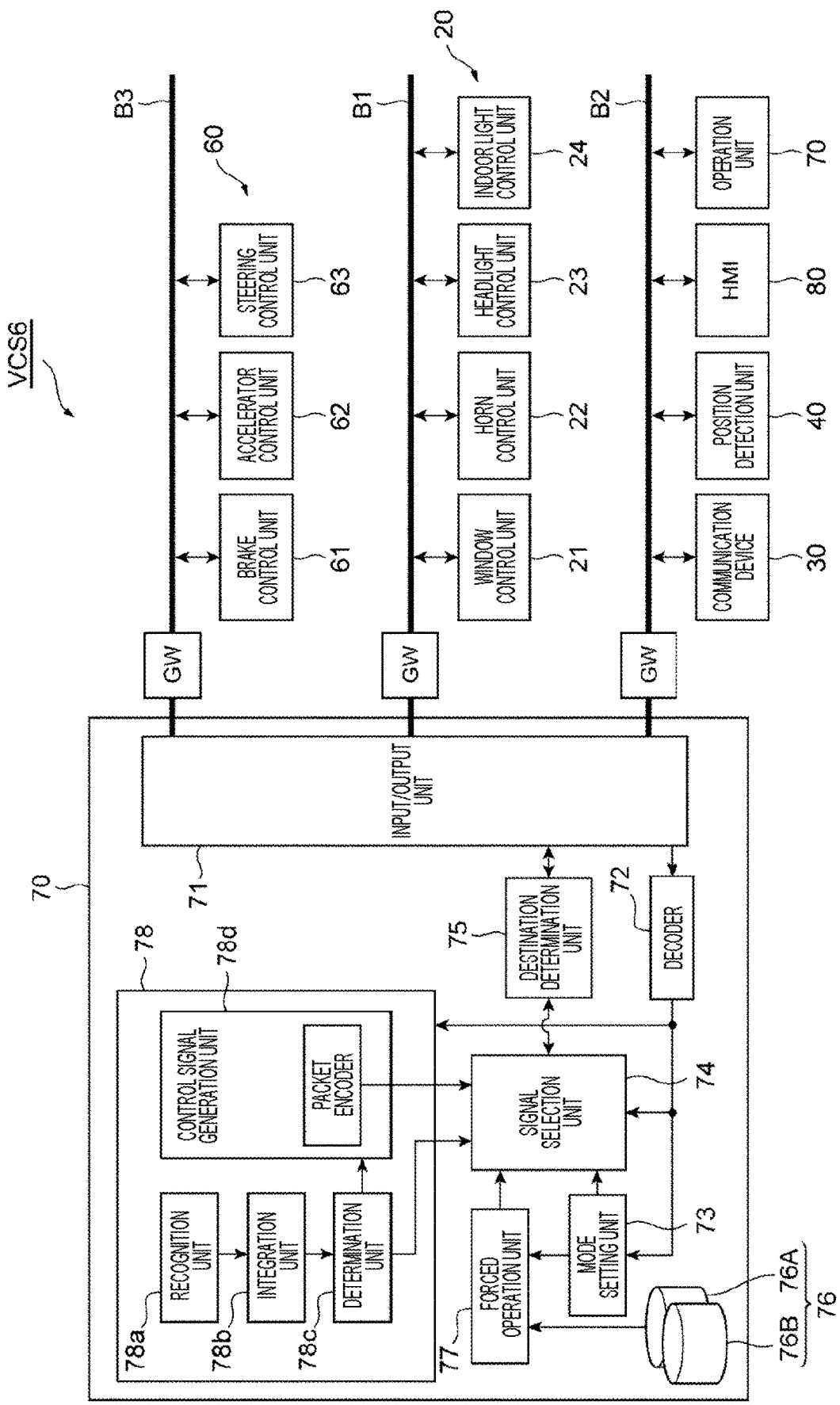
FIG. 14 is a block diagram illustrating a sixth embodiment of the vehicle control system according to the present disclosure.

Next, a sixth embodiment of the vehicle control system according to the present disclosure will be described with reference to FIGS. 1 and 4 of the first embodiment described above and FIG. 14. FIG. 14 is a block diagram of the sixth embodiment of the vehicle control system according to the present disclosure. Note that configurations similar to those in the above-described embodiments will be denoted by the same reference numerals, and the description thereof will be omitted.

A vehicle control system VCS6 of the present embodiment includes a centralized ECU70 instead of the CGW unit 50 of the above-described embodiment. The centralized ECU70 includes a vehicle control unit 78 having not only a relay function between the body bus B1, the information bus B2, and the power train bus B3 but also functions such as automatic driving (AD) and advanced driving assistance (ADAS).

The centralized ECU70 includes an input/output unit 71, a decoder 72, a mode setting unit 73, a signal selection unit 74, a destination determination unit 75, a storage unit 76 (76A, 76B), a forced operation unit 77, and the vehicle control unit 78. The input/output unit 71 is connected to the body bus B1, the information bus B2, and the power train bus B3 via a gateway GW.

The input/output unit 71 outputs a signal input via the gateway GW to the decoder 72. The decoder 72 decodes the signal input from the input/output unit 71 and outputs the decoded signal to the signal selection unit 74 and the mode setting unit 73. Upon receiving a forced control instruction from the outside of the vehicle V via the communication device 30, the information bus B2, the gateway GW, the input/output unit 71, and the decoder 72, the mode setting unit 73 outputs a forced mode signal to the forced operation unit 77 and the signal selection unit 74.

Upon receiving the forced mode signal from the mode setting unit 73, the forced operation unit 77 reads a forced operation signal stored in the storage unit 76 and outputs the read forced operation signal to the signal selection unit 74. Here, the forced operation signal is a signal of forcibly operating the vehicle V by the operation control unit 20 or the operation control unit 60.

The vehicle control unit 78 includes, for example, a recognition unit 78a configured to recognize pieces of external world information, an integration unit 78b configured to integrate the pieces of external world information recognized by the recognition unit 78a, and a determination unit 78c configured to determine a traveling situation of the vehicle V and a surrounding situation thereof based on the external world information integrated by the integration unit 78b. Further, the vehicle control unit 78 also includes a control signal generation unit 78d configured to generate a vehicle control signal of controlling the operation control unit 60 of the vehicle V based on the traveling situation of the vehicle V and the surrounding situation thereof, and to output the vehicle control signal to the signal selection unit 74.

The signal selection unit 74 allows all the operation signals and the vehicle control signals to pass therethrough before receiving the forced mode signal. After receiving the forced mode signal, the signal selection unit 74 blocks at least a part of the operation signals and the vehicle control signals, and allows the forced operation signal instead of the blocked operation signal and vehicle control signal to pass through the destination determination unit 75.

The destination determination unit 75 assigns a destination to each of the operation signal, the vehicle control signal, and the forced operation signal input from the signal selection unit 74, and outputs the respective signals to the body bus B1, the information bus B2, or the power train bus B3. The centralized ECU70 controls the operation of the vehicle V by controlling the operation control unit 20 and the operation control unit 60 based on the operation signal and the control signal or the forced operation signal passing through the signal selection unit 74.

As described above, the vehicle control system VCS6 of the present embodiment further includes the vehicle control unit 78 configured to recognize external world information around the vehicle V and to generate the vehicle control signal of controlling the operation control unit 60 based on the external world information. The signal selection unit 74 allows the operation signal, the forced operation signal, or the vehicle control signal to pass therethrough based on the external world information after receiving the forced mode signal.

According to such a configuration, the vehicle control system VCS of the present embodiment can achieve effects similar to those of the vehicle control system VCS of the first embodiment described above. In addition, according to the vehicle control system VCS6 of the present embodiment, by using the traveling situation of the vehicle V and the external world information recognized by the vehicle control unit 78, it is possible to achieve effects similar to those of the vehicle control system VCS4 of the above-described fourth embodiment.

Although the embodiment of the vehicle control system according to the present disclosure has been described in detail with reference to the drawings, the specific configuration is not limited to this embodiment, and design changes and the like without departing from the gist of the present disclosure are included in the present disclosure.

REFERENCE SIGNS LIST 10 operation unit
20 operation control unit
203 mode setting unit
204 signal selection unit
207 forced operation unit
21 window control unit (operation control unit)
21Y internal authentication unit
22 horn control unit (operation control unit)
22Y internal authentication unit
23 headlight control unit (operation control unit)
23Y internal authentication unit
24 indoor light control unit (operation control unit)
24Y internal authentication unit
30 communication device
40 position detection unit
404 forced mode determination unit
405 position information calculation unit
40Y internal authentication unit
52 packet separation unit (signal selection unit)
53 selector (signal selection unit)
56 mode setting unit
58 forced operation unit
58A encryption unit
59 signal selection unit
5X traveling state determination unit
5Y external authentication unit
60 operation control unit
61 brake control unit (operation control unit)
62 accelerator control unit (operation control unit)
63 steering control unit (operation control unit)
73 mode setting unit
74 signal selection unit
77 forced operation unit
78 vehicle control unit
V vehicle
VCS vehicle control system VCS2 vehicle control system
VCS4 vehicle control system
VCS5 vehicle control system
VCS6 vehicle control system

The invention claimed is:

1. A vehicle control system mounted on a vehicle, the vehicle control system comprising:
one or more processors configured to:
output an operation signal corresponding to an operation by a driver,
control an operation of the vehicle based on the operation signal,
receive a signal transmitted from an outside of the vehicle,
output a forced mode signal upon receiving a forced control instruction from the outside of the vehicle in a forced model,
output a forced operation signal of forcibly operating the vehicle to the operation control unit,
allow all the operation signals to pass therethrough before receiving the forced mode signal and block all the forced operation signals before receiving the forced mode signal in a normal mode,
block at least a part of the operation signals and allow the forced operation signal instead of the blocked operation signal to pass therethrough after receiving the forced mode signal in the forced mode, and
control the operation of one or more vehicle components of the vehicle based on the forced operation signal passed through.

2. The vehicle control system according to claim 1, wherein each of the operation signal, the forced control instruction, and the forced operation signal includes identification information of identifying the operation signal and the forced operation signal.

3. The vehicle control system according to claim 1, wherein the one or more processors are configured to:
determine a traveling state of the vehicle,
output a first forced operation signal not related to traveling of the vehicle when the one or more processors determine that the vehicle is traveling, and output a second forced operation signal related to the traveling of the vehicle when the one or more processors determine that the vehicle is stopped.

4. The vehicle control system according to claim 1, wherein the one or more processors are configured to:
authenticate the encrypted forced control instruction,
encrypt the forced operation signal, and
authenticate the encrypted forced operation signal.

5. The vehicle control system according to claim 1, wherein the one or more processors are configured to detect a position of the vehicle,
calculate position information of the vehicle, determine whether or not the forced mode signal is received, and
transmit the position information to the outside of the vehicle when the forced mode signal is received.

6. The vehicle control system according to claim 1, wherein the one or more processors are configured to:
recognize external world information around the vehicle and generate a vehicle control signal of controlling based on the external world information, and
allow the operation signal, the forced operation signal, or the vehicle control signal to pass therethrough based on the external world information after receiving the forced mode signal.

* * * * *